US010508487B2

(12) United States Patent
Satoh et al.

(10) Patent No.: US 10,508,487 B2
(45) Date of Patent: Dec. 17, 2019

(54) DIMMING SYSTEM

(71) Applicant: SHARP KABUSHIKI KAISHA, Sakai, Osaka (JP)

(72) Inventors: Eiji Satoh, Sakai (JP); Nobuyuki Ito, Sakai (JP); Yufeng Weng, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 85 days.

(21) Appl. No.: 15/736,480

(22) PCT Filed: May 6, 2016

(86) PCT No.: PCT/JP2016/063636
§ 371 (c)(1),
(2) Date: Dec. 14, 2017

(87) PCT Pub. No.: WO2016/203860
PCT Pub. Date: Dec. 22, 2016

(65) Prior Publication Data

US 2018/0195340 A1 Jul. 12, 2018

(30) Foreign Application Priority Data

Jun. 17, 2015 (JP) ................................ 2015-122366

(51) Int. Cl.

| | |
|---|---|
| ***G02F 1/153*** | (2006.01) |
| ***E06B 3/67*** | (2006.01) |
| ***E06B 9/24*** | (2006.01) |
| *G02F 1/15* | (2019.01) |

(52) U.S. Cl.
CPC .............. *E06B 3/6722* (2013.01); *E06B 9/24* (2013.01); *E06B 2009/2464* (2013.01); *G02F 1/15* (2013.01)

(58) Field of Classification Search
CPC ........................................................ G02F 1/15
See application file for complete search history.

(56) References Cited

U.S. PATENT DOCUMENTS

| | | | | |
|---|---|---|---|---|
| 6,413,643 | B1 | 7/2002 | Kunisada et al. | |
| 6,592,996 | B1 | 7/2003 | Kunisada et al. | |
| 2012/0194895 | A1* | 8/2012 | Podbelski | G02F 1/157 359/275 |
| 2016/0231637 | A1 | 8/2016 | Satoh et al. | |

FOREIGN PATENT DOCUMENTS

| | | | |
|---|---|---|---|
| JP | 5-24441 | A | 2/1979 |
| JP | 2-43393 | U | 3/1990 |
| JP | H07-293146 | A | 11/1995 |
| JP | 8-184273 | A | 7/1996 |
| JP | 2000-302486 | A | 10/2000 |
| JP | 2004-150201 | A | 5/2004 |
| WO | 2014/175190 | A1 | 10/2014 |
| WO | 2015/040975 | A1 | 3/2015 |

* cited by examiner

*Primary Examiner* — Joseph P Martinez
(74) *Attorney, Agent, or Firm* — ScienBiziP, P.C.

(57) ABSTRACT

A light adjustment system is, for example, a light adjustment window (1) including: a windowpane (11); a light adjustment device (40); a drive device (50); and a frame (20) having an incorporating (24) into which the windowpane (11) and the drive device (50) are incorporated. A part of the frame (20) includes: a containing section (26) that contains at least a part of the drive device (50); and an opening and closing section (27) that openably and closably covers the containing section (26).

16 Claims, 9 Drawing Sheets

DIMMING SYSTEM

TECHNICAL FIELD

The present invention relates to a light adjustment system which causes a change in light transmittance by applying a voltage.

BACKGROUND ART

In recent years, a light adjustment window having a light adjustment function called, for example, a smart window, has been put into practical use. The light adjustment window is capable of adjusting light transmittance of glass by applying a voltage.

The light adjustment window is capable of light blockage or light reduction, heat insulation, and the like due to having a variable optical characteristic of the window, and thus enables a significant reduction in heating and cooling load and the like of, for example, a building, a vehicle, etc. For this reason, the light adjustment window has been attracting attention as one of measures for achieving energy conservation.

Meanwhile, there is also known a technique in which a display device is used as light adjusting means, so that the light adjustment window is used for performing display (for example, see Patent Literature 1 etc.).

CITATION LIST

Patent Literature

[Patent Literature 1]

International Publication No. 2014/175190, Pamphlet [Publication Date: Oct. 30, 2014]

SUMMARY OF INVENTION

Technical Problem

In order to drive such a light adjustment window, at least a power source section and a control section are necessary.

Patent Literature 1 discloses that in a case where double-glazed glass includes a display device, a spacer of the double-glazed glass is provided with a cable through passage in order to prevent degradation of appearance due to a visible cable for supplying electric power and an image signal to the display device as well as preventing breakage of the cable.

However, Patent Literature 1 does not particularly mention a positional arrangement of a power source section and a control section of the display device. Further, in Patent Literature 1, the display device is provided to a fixed window of a vehicle or the like. In this configuration, a power source and an input for a signal are integrated with a main body, and not intended to be detached from the main body. Patent Literature 1 mentions nothing about a positional arrangement of a power source section, a control section, and the like with respect to a member such as a frame (sash) which is replaceable independently of a building.

In a case where the light adjustment window is applied to a movable window (e.g., a double sliding window and a sash window) which in itself is movable, versatility can be significantly improved.

However, conventionally, there are no documents or actual examples as to how a power source section and a control section should be arranged with respect to a movable window such as a double sliding window.

In a case where (i) a power source section, a control section, and the like are provided to a support such as a window frame (a sash) having an incorporating section into which a light transmissive member (e.g., a windowpane), which is a light adjustment target for which light adjustment is preformed, is incorporated and (ii) the power source section and the control section become unable to operate due to an end of product life or a failure, a frame or a shoji (a sliding door) which includes a grating channel, a frame, and the like needs to be taken apart for battery replacement, parts replacement, repair, and the like.

However, taking the frame apart requires a great amount of time and effort. Further, in a case where the light adjustment window employs double-glazed glass, dust and a foreign matter may enter a gap between glass plates.

The present invention is accomplished in view of the foregoing problem. An object of the present invention is to provide a light adjustment system which (i) includes a drive device provided to a support having an incorporating section into which a light transmissive member is incorporated and (ii) allows repair, battery replacement, parts replacement, and the like of the drive device without a need to take the incorporating section apart.

Solution to Problem

In order to attain the object, a light adjustment system in accordance with one aspect of the present invention is a light adjustment system, including: a light transmissive member; a light adjustment device disposed so as to face the light transmissive member, the light adjustment device applying a voltage so as to cause a change in transmittance of light; a drive device that drives the light adjustment device; and a support having an incorporating section into which the light transmissive member and the light adjustment device are incorporated, a part of the support including (i) a containing section that contains at least a part of the drive device and (ii) an opening and closing section that openably and closably covers the containing section.

Advantageous Effects of Invention

According to one aspect of the present invention, it is possible to provide a light adjustment system which allows repair, battery replacement, parts replacement, and the like of the drive device without a need to take the incorporating section apart.

BRIEF DESCRIPTION OF DRAWINGS (a) of FIG. 1 is an elevation view schematically illustrating a configuration of a light adjustment window in accordance with Embodiment 1 of the present invention. (b) of FIG. 1 is a cross-sectional view schematically illustrating a main part of the light adjustment window in accordance with Embodiment 1 of the present invention.

Figure 4:
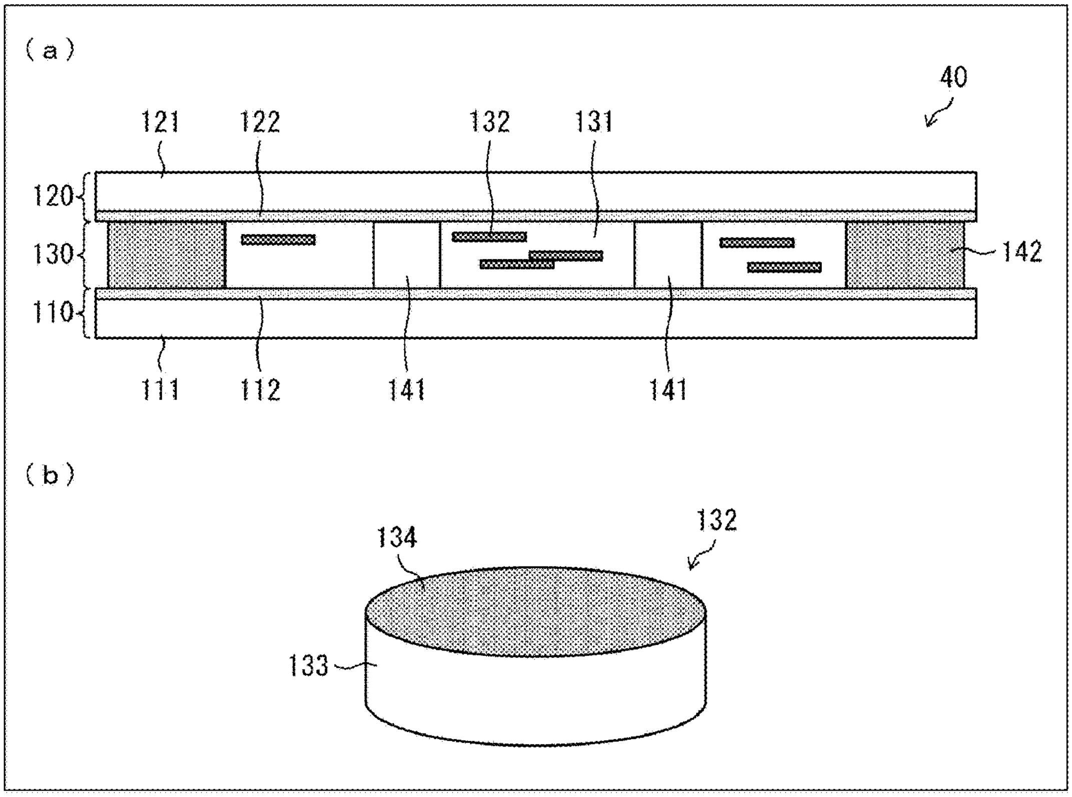

(a) of FIG. 4 is a cross-sectional view illustrating an example of a schematic configuration of a light adjustment device in accordance with Embodiment 1 of the present invention, and (b) of FIG. 4 is a perspective view illustrating an example of a shape-anisotropic member used in the light adjustment device in accordance with Embodiment 1 of the present invention.

Figure 5:
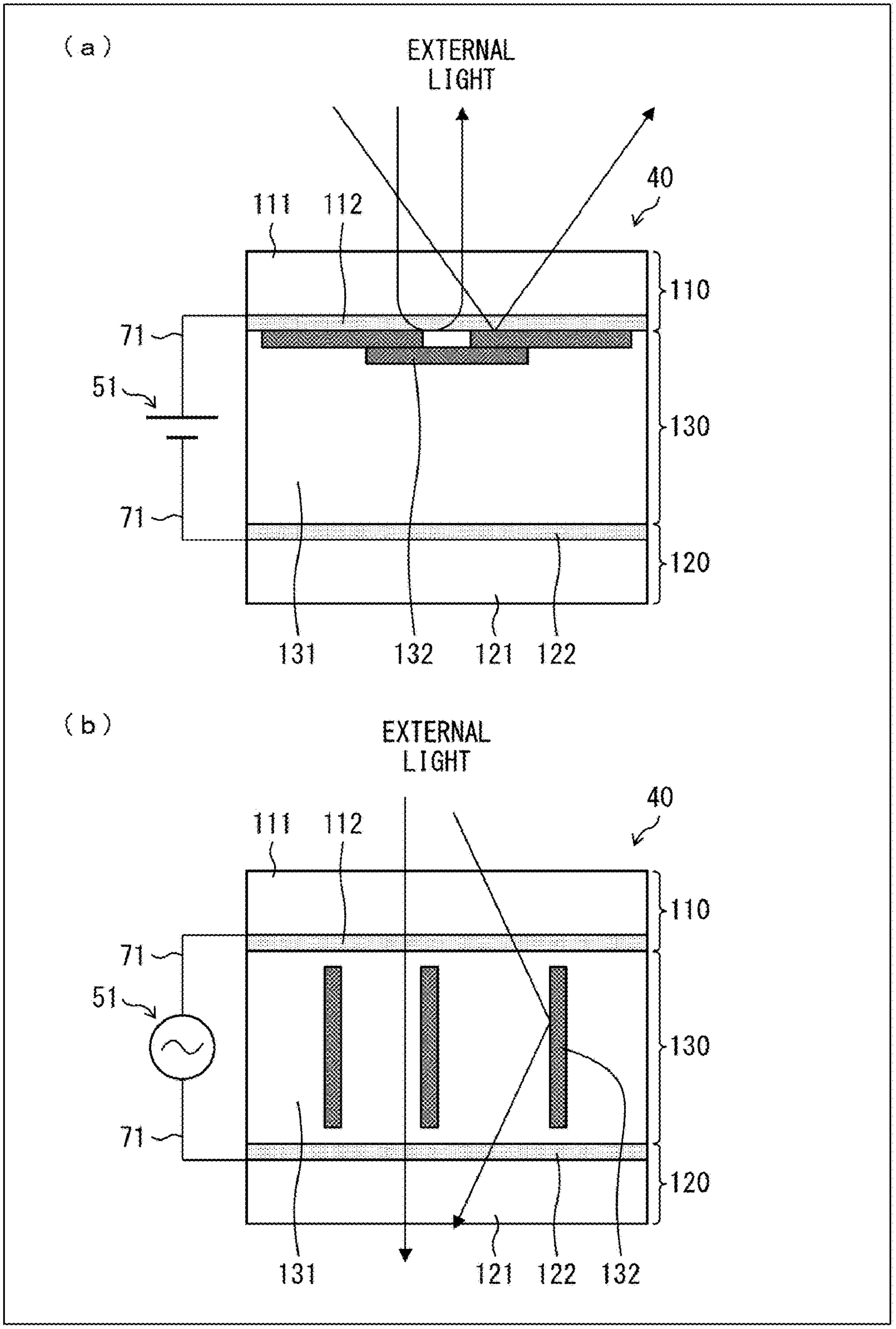

(a) of FIG. 5 is a view illustrating a near-infrared light reflective state of the light adjustment device in accordance with Embodiment 1 of the present invention, and (b) of FIG. 5 is a view illustrating a near-infrared light transmissive state of the light adjustment device in accordance with Embodiment 1 of the present invention.

Figure 6:
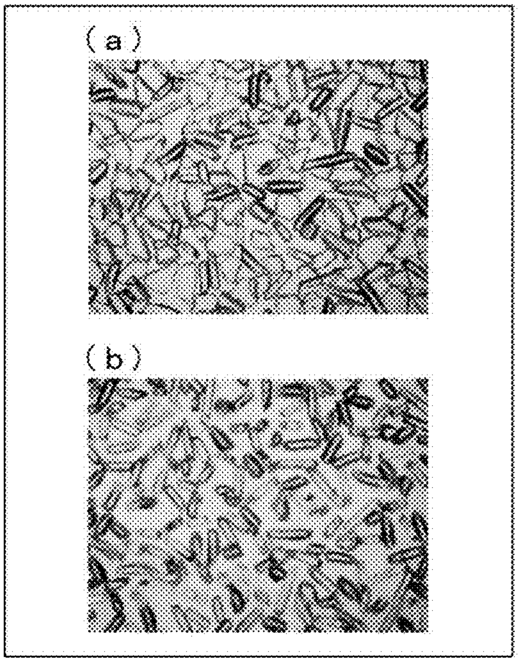

(a) and (b) of FIG. 6 are views each showing a photomicrograph obtained by capturing an image of an alignment state of flakes in a plan view when a voltage was applied between electrodes which were facing each other in a light adjustment device which had actually been produced in Embodiment 1 of the present invention. (a) of FIG. 6 shows a case in which a DC voltage of 2 V was applied between the electrodes, and (b) of FIG. 6 shows a case in which an AC voltage of 60 Hz and 5 V was applied between the electrodes.

Figure 7:
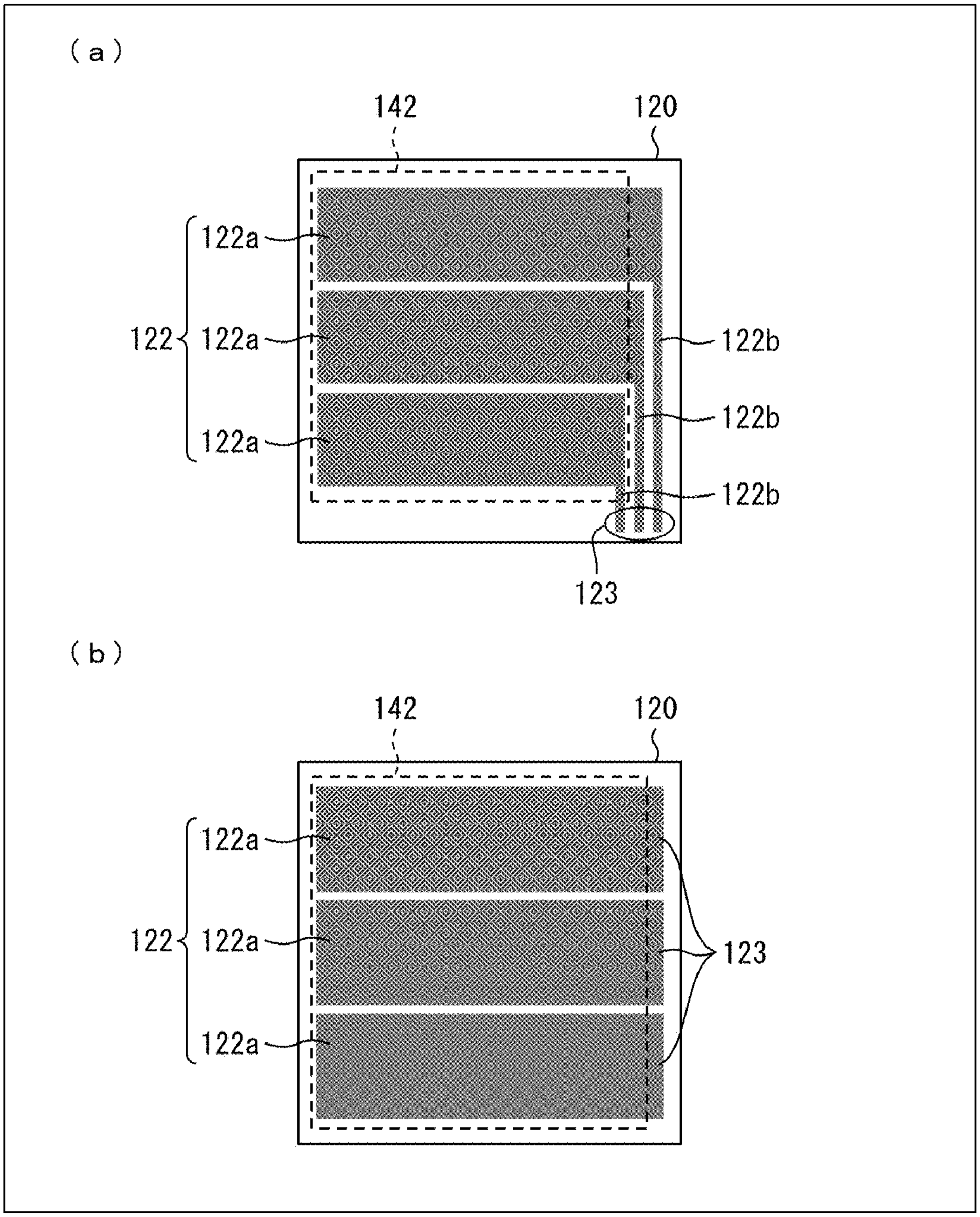

(a) and (b) of FIG. 7 are views illustrating an example in which an electrode for applying a voltage to a light modulation layer is divided in the light adjustment device in accordance with Embodiment 1 of the present invention.

Figure 8:
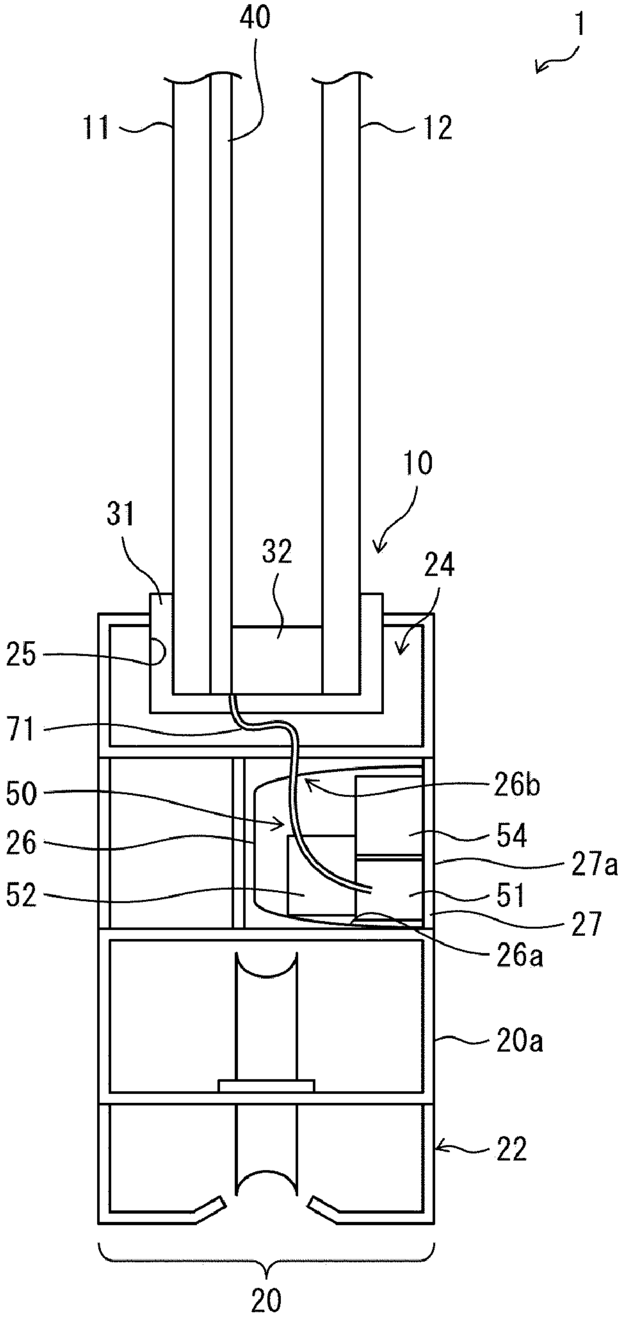

FIG. 8 is a cross-sectional view schematically illustrating a main part of a light adjustment window in accordance with Embodiment 2 of the present invention.

Figure 9:
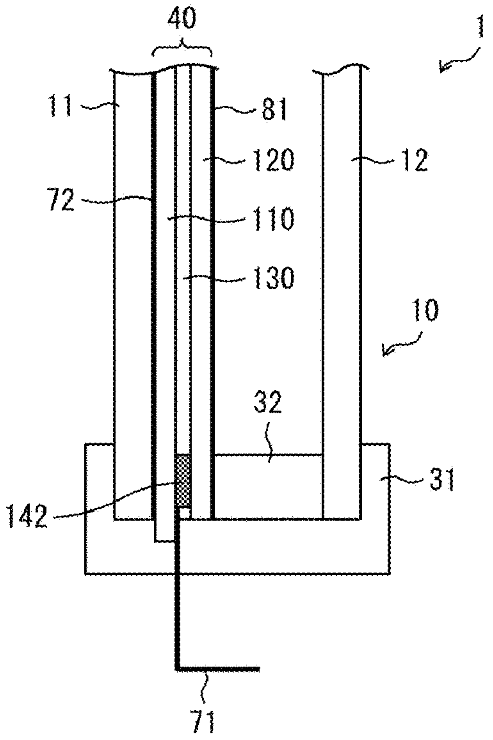

FIG. 9 is a cross-sectional view schematically illustrating a main part of a window main body unit of the light adjustment window in accordance with Embodiment 2 of the present invention.

Figure 10:
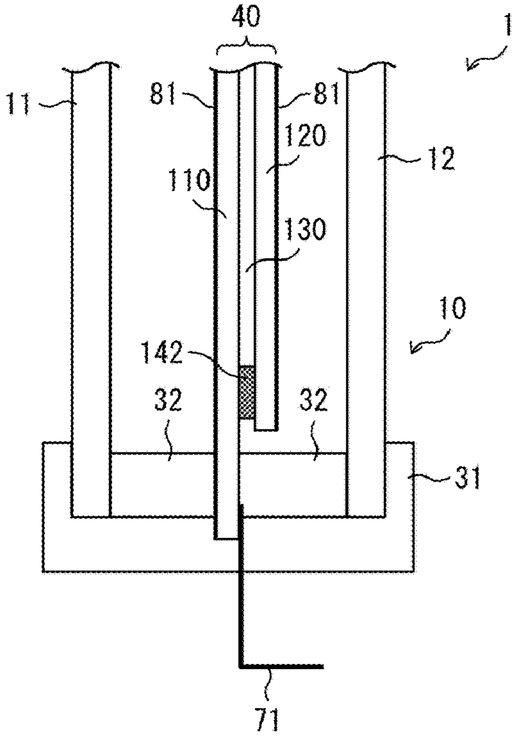

FIG. 10 is a cross-sectional view schematically illustrating a main part of a window main body unit of a light adjustment window in accordance with Embodiment 3 of the present invention.

Figure 11:
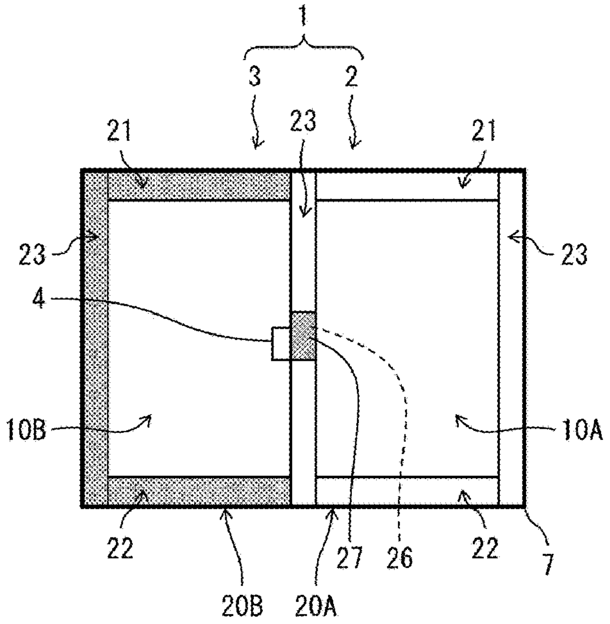

FIG. 11 is an elevation view schematically illustrating a main part of a light adjustment window in accordance with Embodiment 4 of the present invention.

Figure 12:
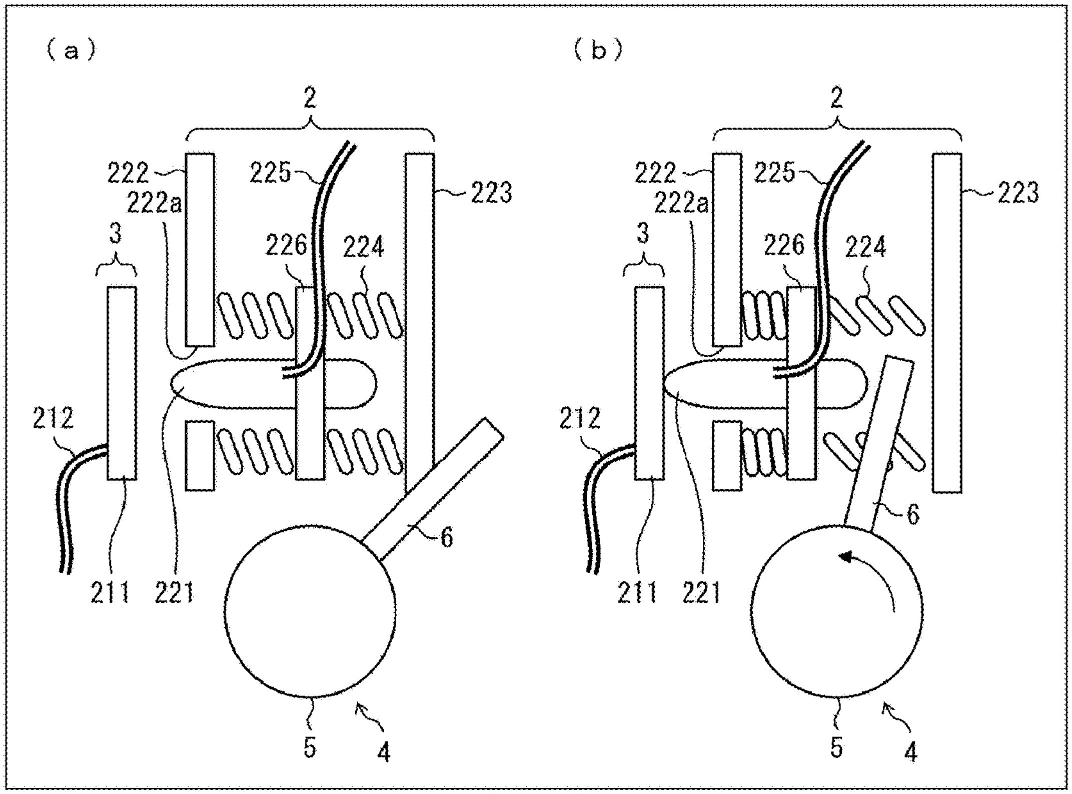

(a) and (b) of FIG. 12 are cross-sectional views each schematically illustrating a main part of the light adjustment window in accordance with Embodiment 4 of the present invention. (a) of FIG. 12 shows a state in which the light adjustment window is unlocked, and (b) of FIG. 12 shows a state in which the light adjustment window is locked.

DESCRIPTION OF EMBODIMENTS

The following description will discuss embodiments of the present invention in detail.

[Embodiment 1]

An embodiment of the present invention will be discussed below with reference to (a) and (b) of FIG. 1 and (a) and (b) of FIG. 7.

The description below of Embodiment 1 will be given on the basis of an example case in which a light adjustment system in accordance with Embodiment 1 is a light adjustment window (a window having a light adjustment function), but Embodiment 1 is not limited to this.

<Schematic Configuration of Light Adjustment Window 1>

Figure 1:
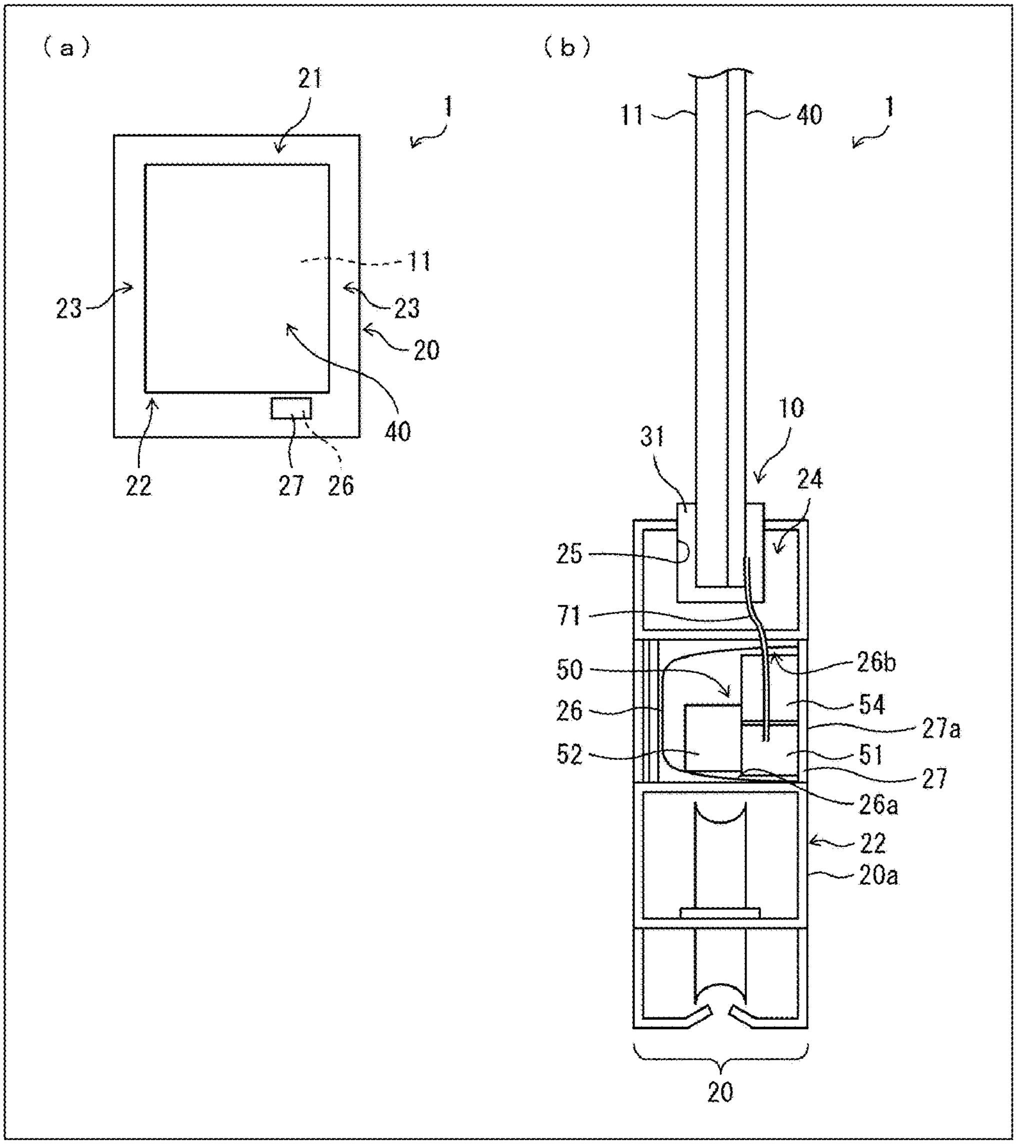
Figure 2:
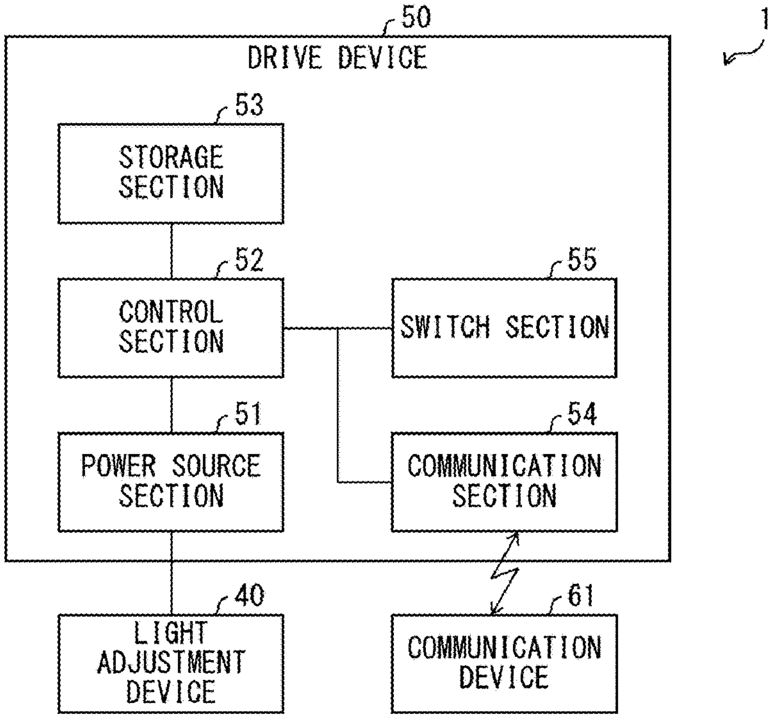
FIG. 2 is a block diagram schematically illustrating a main part of a light adjustment system of the light adjustment window in accordance with Embodiment 1 of the present invention.

(a) of FIG. 1 is an elevation view schematically illustrating a configuration of a light adjustment window 1 in accordance with Embodiment 1. (b) of FIG. 1 is a cross-sectional view schematically illustrating a main part of the light adjustment window 1 in accordance with Embodiment 1. FIG. 2 is a block diagram schematically illustrating a main part of the light adjustment window 1.

As illustrated in (a) and (b) of FIG. 1 and FIG. 2, the light adjustment window 1 (a light adjustment system) in accordance with Embodiment 1 includes a window main body unit 10, a frame 20 (a support), a drive device 50, and a communication device 61 (a communication terminal).

More specifically, the light adjustment window 1 (the light adjustment system) in accordance with Embodiment 1 includes a windowpane 11 (a window main body, a light transmissive member), the frame 20, a grating channel 31, a light adjustment device 40, the drive device 50, and the communication device 61. Note that the following description will be given on the basis of an example case in which the light adjustment window 1 is a movable window (a shoji). However, Embodiment 1 is not limited to this, and the light adjustment window 1 may be a fixed window.

(Windowpane 11)

The windowpane 11, which is a light adjustment target for which light adjustment is performed by the light adjustment device 40, is a light transmissive member having a light-transmitting property, and is constituted by a transparent glass member in a shape of a flat plate.

(Frame 20)

The frame 20 is a support which supports the windowpane 11, the light adjustment device 40, and the drive device 50. The frame 20 has a frame shape in conformity with an outer shape of the windowpane 11. (a) and (b) of FIG. 1 show an example case in which the windowpane 11 has a rectangular shape and the frame 20 is formed in a shape of a rectangular frame in conformity with an outer shape of the windowpane 11.

The frame 20 includes a frame 20 (a sash) in a shape of a frame having, at four peripheral edges thereof, an upper rail 21, a lower rail 22, and right and left stiles 23 and 23.

The frame 20 has an incorporating section 24 which is provided as a support section for supporting the windowpane 11 and the light adjustment device 40. The incorporating section 24 (the support section), which is a section into which the windowpane 11 and the light adjustment device 40 are incorporated, of the upper rail 21, the lower rail 22, and the stiles 23 and 23 constituting the frame 20 has a recess 25 for supporting the windowpane 11 and the light adjustment device 40 by having the windowpane 11 and the light adjustment device 40 fitted into the recess 25 (i.e., for incorporating the windowpane 11 and the light adjustment device 40 into an inner side of the frame 20).

The frame 20 includes, in a part thereof, a containing section 26 that contains an object to be contained and an opening and closing section 27 that opens and closes the containing section 26. The containing section 26 and the opening and closing section 27 will be described later.

(Grating Channel 31)

In a gap between (i) the recess 25 and (ii) the windowpane 11 and the light adjustment device 40, the grating channel 31 is provided as a gasket.

The grating channel 31 is wound around the windowpane 11 and the light adjustment device 40 so as to sandwich the windowpane 11 and the light adjustment device 40. The windowpane 11 and the light adjustment device 40 are held inside the frame 20 by being fixed by the grating channel 31 within the recess 25.

The windowpane 11 and the light adjustment device 40 are integrated with each other by means of the grating channel 31. The windowpane 11, the light adjustment device 40, and the grating channel 31 are integrally assembled, as a single window main body unit 10, to the frame 20. In other words, the frame 20 is a support for supporting the window main body unit 10, and the incorporating section 24 is a section (a support section) of the frame 20 into which section the window main body unit 10 is incorporated.

Since an end of each of the windowpane 11 and the light adjustment device 40 is thus covered with the grating channel 31, it is possible to both (i) prevent the windowpane 11 and the light adjustment device 40 from coming into contact with the frame 20 (the sash) and (ii) fill in a gap between (a) the windowpane 11 and the light adjustment device 40 and (b) the frame 20 so as to ensure airtightness and watertightness at the incorporating section 24.

(Light Adjustment Device 40)

The light adjustment device 40 is a light modulating device which causes a change in light transmittance by application of an electric field. The light adjustment device 40 is disposed so as to face the windowpane 11. The light adjustment device 40 causes a change in transmittance of incident light, which has entered the light adjustment device through the windowpane 11, so as to adjust a transmittance of light passing through the windowpane 11 (i.e., so as to perform light adjustment).

As viewed from a direction perpendicular to a plate surface of the windowpane 11 as illustrated in (b) of FIG. 1, the light adjustment device 40 is superposed on the plate surface of the windowpane 11.

In Embodiment 1, as illustrated in (a) and (b) of FIG. 1, for example, the light adjustment device 40 is in a form of a sheet having an outer shape approximately identical to the outer shape of the windowpane 11, and is fixed to the windowpane 11 by being attached to a whole of one of plate surfaces of the windowpane 11 fixed to the frame 20.

In Embodiment 1, the light adjustment device 40 is attached to a plate surface of the windowpane 11 on an interior side, and performs light adjustment by causing a change in transmittance of incident light entering the light adjustment device 40 through the windowpane 11 which faces outdoors. Note that the light adjustment device 40 will be detailed later.

(Drive Device 50)

The drive device 50 is a drive section for driving the light adjustment device 40, and causes a change in transmittance of incident light which has entered the light adjustment device 40. The drive device 50 includes a power source section 51, a control section 52, a storage section 53, a communication section 54, and a switch section 55.

It is preferable that the drive device 50 be provided (mounted) separately from the incorporating section 24 so that the drive device 50 can be replaced and repaired without a need to take apart the incorporating section 24, which is the portion into which the windowpane 11 is incorporated (fitted).

As such, at least a part of the drive device 50 is provided, as the object to be contained, in the containing section 26 so as to be replaced and repaired through the opening and closing section 27. It is preferable here that a component which is highly likely to need replacement and repair be provided in the containing section 26. For example, it is preferable that at least the power source section 51 and the control section 52 of the drive device 50 be provided in the containing section 26.

Further, in a case where, as illustrated in FIG. 2, the drive device 50 includes the storage section 53, the communication section 54, the switch section 55, and the like, it is preferable that at least one of the storage section 53, the communication section 54, the switch section 55, and the like is provided in the containing section 26 together with the power source section 51 and the control section 52. Note that although the description of Embodiment 1 is given on the basis of an example case in which the entire drive device 50 is provided inside the containing section 26, Embodiment 1 is not limited to this.

The power source section 51 is a power source circuit that supplies the light adjustment device 40 with electric power for driving the light adjustment device 40. The power source section 51 applies a predetermined voltage to the light adjustment device 40. The voltage application by the power source section 51 to the light adjustment device 40 is controlled by a control signal from the control section 52 (control circuit).

In the power source section 51, a primary battery or a secondary battery may be detachably contained. A secondary battery which can be charged with electric power from a solar cell can be contained in the power source section 51. Alternatively, for a simpler configuration, electric power from a solar cell may be used directly. In a case of using a solar cell, the solar cell may be provided on a part of a plate surface of the windowpane 11 or on a part of a surface of the frame 20. The solar cell may also be provided on an end surface of the windowpane 11 so as to allow utilizing guided light.

Between the power source section 51 and the light adjustment device 40, a plurality of wires 71 for connecting the power source section 51 and the light adjustment device 40 to each other are provided. A terminal of each of the plurality of wires 71 extending from the power source section 51 is connected to the light adjustment device 40.

The control section 52 is a circuit substrate having a control circuit that controls driving of the light adjustment device 40, and controls an operation of each section (e.g., the power source section 51), connected to the control section 52, of the drive device 50 which drives the light adjustment device 40.

For example, by controlling the voltage application by the power source section 51 to the light adjustment device 40, the control section 52 controls the driving of the light adjustment device 40 (i.e., controls the light adjustment performed by the light adjustment device 40).

The control section 52, for example, is an arithmetic processing section such as a CPU (Central Processing Unit) and a dedicated processor.

An operation of each section of the drive device 50 for driving the light adjustment device 40 is controlled by the control section 52 by, for example, (i) reading out (a) various kinds of information stored in the storage section 53 such as a RAM (Random Access Memory), a ROM (Read Only Memory), and an HDD (Hard Disc Drive) and (b) a program which is stored in the storage section 53 and in accordance with which various kinds of controls are carried out and (ii) executing the programs. As a result of execution of the program, for example, a voltage switching control section, a communication control section, and the like are configured in the control section 52.

As described above, the drive device 50 may include the communication section 54, and as illustrated in FIG. 2, the communication section 54 may be connected to the control section 52.

In a case where the communication section 54 is provided in the containing section 26, it is preferable that at least the opening and closing section 27 be constituted by an insulator or, for example, a member capable of transmitting infrared rays and the like, so as to allow communication of a signal from the communication device 61.

The communication section 54 has at least a receiving section for receiving a signal for driving the light adjustment device 40. The communication section 54 is configured, for example, to be able to have data communications with the communication device 61.

The communication device 61 is, for example, a terminal device such as a remote controller and includes, as an operation section (not shown), for example, a switch section which is provided with a switch or the like that switches a light adjustment state of the light adjustment device 40.

The communication device 61 and the communication section 54 are connected to each other through infrared ray communication, wireless communication such as Wi-Fi (Wireless Fidelity: Registered Trademark) and Z-wave (Registered Trademark), and the like.

A direction of the communication may be one-way transmission in which a control signal related to control of the light adjustment device 40 is transmitted from the communication device 61 to the communication section 54, or two-way transmission in which, for example, an error signal of the light adjustment device 40 is transmitted to the communication device 61 and content of the error signal is displayed by the communication device 61. That is, the communication section 54 may include a transmitting section in addition to the receiving section.

As described above, the drive device 50 may include the switch section 55, and as illustrated in FIG. 2, the switch section 55 may be connected to the control section 52.

The switch section 55, for example, includes a switch that switches a light adjustment state of the light adjustment device 40, and the operator operates the switch section 55 so that the light adjustment state of the light adjustment device 40 is switched. The user's operation of the switch causes an operation input signal from the switch section 55 to be transmitted to the control section 52. On the basis of the operation input signal, the control section 52 instructs the power source section 51 to switch the light adjustment state of the light adjustment device 40.

As described above, the switch section 55 may be provided in the containing section 26. For example, the switch section 55 may be provided in a predetermined position on a surface of the frame 20 on the interior side at which predetermined position the operator can operate the switch section 55.

In any case, it is preferable that each section of the drive device 50 be provided separately from and independently of the incorporating section 24 which is a section of the light adjustment window 1 into which section the windowpane 11 is incorporated. This allows the each section to be replaced and repaired without a need to take the incorporating section 24 apart.

Switching of the light adjustment state of the light adjustment device 40 may thus be performed manually through the communication device 61 and the switch section 55. Alternatively, it is also possible to perform the switching of the light adjustment state of the light adjustment device 40, for example, automatically and periodically by providing a timer section (a clock) in the drive device 50 without providing the communication section 54 and the switch section 55 in the drive device 50. Note that the timer section may be provided separately from the control section 52, or provided in the control section 52. That is, the timer section may be realized by a program.

In this case, the control section 52 switches the light adjustment state of the light adjustment device 40, for example, on the basis of a time schedule stored in the storage section 53. That is, the light adjustment state of the light adjustment device 40 is automatically controlled in accordance with the time schedule stored in the storage section 53.

In a case where the light adjustment device 40 is a near-infrared ray light adjustment device (near-infrared ray light adjustment section), control of an intake of near-infrared rays into a room may be performed, for example, so as to reflect information from the Internet regarding a weather and a temperature in each region. The communication section 54 is capable of wireless data communication with the communication device 61 or an external device (not shown). For example, it is possible to employ a configuration in which (i) weather information related to a weather, temperature, and the like corresponding to an address of a place in which the light adjustment device 40 (i.e., the light adjustment window 1) is installed is delivered as a service from a server device (an information delivery server, a management server, an external device) provided on the Internet and through a communication network such as the Internet, and (ii) the weather information is received through the communication device 61 or received directly by the communication section 54, so as to be reflected to the control of the light adjustment device 40. That is, the communication section 54 may perform data communication with the server device through the communication device 61, which is an external communication terminal, or perform data communication directly with the server device, so that information thus obtained is used for the light adjustment by the light adjustment device 40.

In accordance with the weather information obtained through the communication section 54, the control section 52 controls the driving of the light adjustment device 40 so as to achieve a target rate of obtaining solar radiation (a target infrared transmittance).

For example, the storage section 53 has stored therein a LUT (Look Up Table) in which weather (weather, temperature) and a voltage to be applied to the light adjustment device 40 are associated with each other. The control section 52 reads out the LUT as necessary, and calculates, with use of the LUT, a voltage which is to be applied to the power source section 51 and corresponds to the weather obtained by the communication section 54. Then, a control signal for controlling a voltage to be applied to the light adjustment device 40 is transmitted by the control section 52 to the power source section 51 so as to achieve a target rate of obtaining solar radiation heat (a target infrared transmittance). Thus, the light adjustment by the light adjustment device 40 is controlled.

Instead of connecting the communication device 61 or the communication section 54 to the Internet, it is possible to connect the communication device 61 or the communication section 54 to a HEMS (Home Energy Management System) connected to a smart meter, so that an indoor temperature, an outdoor temperature, and power consumption are managed in combination with a temperature sensor or the like so as to be reflected to an operation of the light adjustment device 40. The HEMS is an electric power management and control system (an external device) which performs, for example, (i) monitoring of power consumption of each household electric appliance in each house, (ii) control of each household electric appliance for power saving, and (iii) monitor and control of a power source for home use such as photovoltaic power generation, fuel cell, or a capacitor. The HEMS manages and controls an amount of electric power used in a preset area where electric power is used. That is, the communication section 54 may be connected to a HEMS controller so as to enable management and control by the HEMS, and the communication device 61 may be the HEMS controller itself. The smart meter is an electric power meter having a communication function, and electric energy measured by the smart meter is transmitted to the HEMS controller together with a time and date of the measurement. The HEMS controller is a control apparatus for carrying out monitoring of power consumption of each household electric appliance (loading equipment) of a user's house, control of the household electric appliance for energy saving, and the like.

According to Embodiment 1, as described above, at least a part of the drive device 50, preferably, at least a part of the drive device 50 which part includes at least the power source section 51 and the control section 52, is provided in the containing section 26 covered by the opening and closing section 27. This allows these components to be replaced and repaired easily without a need to take the incorporating section 24 of the windowpane 11 apart.

Note that in Embodiment 1, it is only necessary that the drive device 50 include at least the power source section 51 and the control section 52, and the storage section 53, the communication section 54, and the switch section 55 are not essential. The drive device 50 may or may not be provided with the storage section 53, the communication section 54, and the switch section 55. Similarly, the communication device 61 is not essential either.

<Containing Section 26 and Opening and Closing Section 27>

The following description will discuss the containing section 26 and the opening and closing section 27 in more detail.

The containing section 26 is provided inside a frame body of the frame 20. The containing section 26 has, on an interior side of the frame 20, an opening **26*a* which forms a space section in which the power source section 51, the control section 52**, and the like are provided as an object to be contained.

The opening and closing section 27 is a lid body which openably and closably covers the opening **26*a*. The opening and closing section 27 is provided so as to allow the opening 26*a* to be opened and closed from an interior side of the frame 20. A surface 27*a* of the opening and closing section 27 on the interior side, for example, is substantially in flush with a surface 20*a* of the frame 20** on the interior side.

It is preferable that the containing section 26 be constituted by, for example, a waterproofed member such as a resin case having a wire through hole **26*b* through which the wires 71 connected to the light adjustment device 40** are passed and which is waterproof sealed.

It is also preferable that, for example, a sealing member (not shown) such as an O ring is provided in a gap between the containing section 26 and the opening and closing section 27 in order to prevent intrusion of water and the like.

The opening and closing section 27 is not particularly limited provided that it is a lid body which openably and closably covers the opening **26*a*. For example, the opening and closing section 27 may be a fitted lid or a sliding lid, and may be detachably fixed to the containing section 26** with use of a screw or the like.

In a case where the opening and closing section 27 is screwed to the containing section 26, it is preferable in terms of appearance that the opening and closing section 27 is provided so that a screw does not protrude from the surface **20*a* of the frame 20** on the interior side when the screw is screwed in.

The opening and closing section 27 may be configured such that the opening and closing section 27 is a part of the frame which part is unrelated to incorporation of the windowpane 11, and the part is openable and closable by being detached.

In any case, it is only necessary that, for example, in order to carry out battery replacement or the like, the containing section 26 in which the power source section 51, the control section 52, and the like are provided can be opened and closed without a need to detach the heavy light adjustment window 1 (shoji) from, for example, a projected window.

Note that (a) and (b) of FIG. 1 show an example case in which the containing section 26 and the opening and closing section 27 are provided to the lower rail 22, but the containing section 26 and the opening and closing section 27 may be provided to a rail (e.g., the upper rail 21, or one of the right and left stiles 23 and 23) other than the lower rail 22.

<Light Adjustment Device 40>

The following description will discuss the light adjustment device 40 in more detail.

(Type of Light Adjustment Device 40)

The light adjustment device 40 may be a display section which switches display by adjusting visible light, or a near-infrared light adjustment section which switches a rate at which solar radiation heat is obtained.

Note that a large part of infrared rays from the sun is near-infrared rays, and control of a rate at which solar radiation heat is obtained is substantially equal to control of near-infrared transmittance. In winter, it is necessary to prevent infrared rays from escaping from a room to the outdoors. The infrared rays in this case, however, have wavelengths of approximately 10 μm, and are classified as far-infrared rays.

A transparent conductive film which transmits near-infrared rays has a characteristic of reflecting far-infrared rays away. That is, in a case where the light adjustment device 40 is controlled in winter so as to take near-infrared rays in, heat inside the room does not escape as radiation heat, so that an ideal state is achieved. Further, in a case where control is made in summer so as to prevent near-infrared rays from entering the room, far-infrared rays also do not enter the room. Thus, an ideal state is achieved.

In a case where the light adjustment device 40 is the display section, the light adjustment device 40 may be a liquid crystal display device in which a polarizing plate is used, a guest-host liquid crystal display device, a polymer dispersed liquid crystal display device, an electrochromic display device, an electrowetting display device, or an EL display device such as an organic EL (electroluminescence) display device or an inorganic EL display device.

In a case where the light adjustment device 40 is the near-infrared light adjustment section, examples of a light adjustment scheme encompass, for example, (1) a scheme in which light adjustment is carried out by rotating a shape-anisotropic member which reflects or absorbs near-infrared rays, (2) a scheme in which switching between a colored state and a colorless state is carried out by means of electrochromic, (3) a scheme in which switching between a transparent state and a mirror state is carried out by means of electrochromic using a silver solution, (4) an electrochromic scheme in which a frequency of surface plasmon resonance by nanocrystals of ITO (tin doped indium oxide) or AZO (Aluminum doped Zinc Oxide) is changed by application of a voltage, and (5) a gaschromic scheme in which switching between a transparent state and a mirror state is carried out by introducing hydrogen into a hollow layer which is in contact with a magnesium-nickel alloy thin film.

In a case where the gaschromic scheme of (5) above is used as the light adjustment scheme, the light adjustment window 1 may be designed such that a gas generating member (not shown) is disposed in the containing section 26 so that the gas generating member, as well as the power source section 51 and the control section 52, can be repaired and replaced through the opening and closing section 27.

In a case where the light adjustment scheme of (1) above in which a shape-anisotropic member is rotated is used, the light adjustment device 40 may be, for example, a SPD (Suspended Particle Device) in which an acicular crystal that absorbs visible light and near-infrared light is rotated so that absorption of external light is changed between a state in which the acicular crystal is random and a state in which the acicular crystal is parallel to an electric field. Alternatively, in place of the SPD, it is possible to use a light adjustment device which employs a scheme in which light adjustment is carried out by rotating a shape-anisotropic member.

(Schematic Configuration of Light Adjustment Device 40)

The following description will discuss in further detail the schematic configuration of the light adjustment device 40 with reference to an example case in which the light adjustment device 40 is a near-infrared light adjustment device (near-infrared light adjustment section) employing the light adjustment scheme in which light adjustment is carried out by rotating a shape-anisotropic member. Note, however, that Embodiment 1 is not limited to this, and the light adjustment device 40 may be, as described above, a publicly-known device of various kinds which has a light adjustment function.

Figure 3:
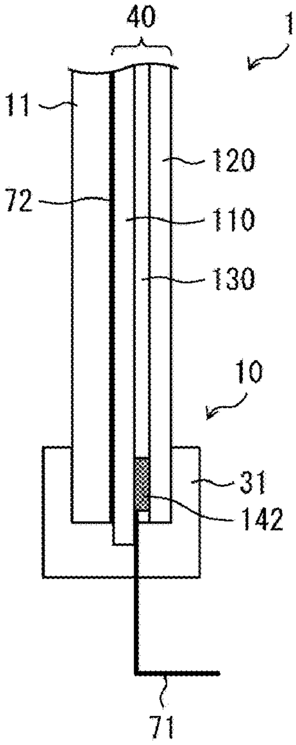
FIG. 3 is a cross-sectional view schematically illustrating a configuration of a main part of a window main body unit of the light adjustment window in accordance with Embodiment 1 of the present invention.

FIG. 3 is another cross-sectional view schematically illustrating a configuration of a main part of the window main body unit 10 of the light adjustment window 1 in accordance with Embodiment 1. (a) of FIG. 4 is a cross-sectional view illustrating an example of a schematic configuration of the light adjustment device 40 in accordance with Embodiment 1, and (b) of FIG. 4 is a perspective view illustrating an example of a shape-anisotropic member 132 used in the light adjustment device 40 in accordance with Embodiment 1.

As illustrated in (b) of FIG. 1 and FIG. 3, the light adjustment device 40 is a light adjustment cell including a pair of substrates 110 and 120 facing each other and a light modulation layer 130 (a light adjustment layer) provided between the pair of substrates 110 and 120.

The substrate 110 includes an insulating substrate 111 and an electrode 112. Similarly, the substrate 120 includes an insulating substrate 121 and an electrode 122.

The light modulation layer 130 is provided between the electrodes 112 and 122 and includes a medium 131 and a plurality of shape-anisotropic members 132 contained in the medium 131.

Each of the insulating substrates 111 and 121 is, for example, a transparent glass substrate or a transparent plastic substrate.

In a case where the insulating substrates 111 and 121 are each a glass substrate, a glass edge is clean-cut and chamfered by abrasion or the like, in order to prevent cracking from heat. In order to prevent the glass substrate from cracking from heat, it is preferable that a clearance between the glass substrate and the frame 20 (the sash) be secured, and then the glass substrate be held by an elastic sealing material.

The electrodes 112 and 122 are each a transparent electrode and is constituted by, for example, a transparent conductive film of tantalum-substituted tin oxide, ITO (Indium Tin Oxide), IZO (Indium Zinc Oxide), zinc oxide, tin oxide, or the like, the conductive film being provided with a seed layer of InTiO (Titanium doped indium oxide) or anatase titanium dioxide.

In Embodiment 1, the light adjustment device 40 is used in light adjustment by the light adjustment window 1. As such, it is preferable that the electrodes 112 and 122 are each an electrode with a low level of near-infrared light absorption in order to achieve as high an near-infrared light transmittance as possible when near-infrared light reflecting surfaces of the shape-anisotropic members 132 are aligned perpendicular to a substrate surface of each of the substrates 110 and 120, and it is more preferable that the electrodes 112 and 122 are each an electrode with a low level of visible light absorption in order to ensure functionality as a window.

On a surface of one of the substrates 110 and 120 which surface faces the other of the substrates 110 and 120, a spacer 141 is provided. Provision of the spacer 141 between the substrates 110 and 120 allows a cell thickness between the substrates 110 and 120 to be maintained constant. Further, in a case where the substrates 110 and 120 are installed upright as illustrated in (b) of FIG. 1, the provision allows preventing the shape-anisotropic members 132, each of which has a specific gravity greater than that of the medium 131, from sinking so as to result in an uneven distribution of the shape-anisotropic members 132 in a plane of each substrate surface.

The substrate 110 and the substrate 120 are bonded to each other with user of a sealing material 142 provided in peripheral sections of both substrates 110 and 120.

As the sealing material 142, for example, a UV (ultraviolet) cure resin is suitably used. It is more preferable that as the sealing material 142, a solvent-resistant sealing material be formed on an inner side where the sealing material 142 comes in contact with the medium 131, and a sealing material with high adhesive force is further formed on an outer side of the solvent-resistant sealing material.

The shape-anisotropic members 132 may each have a shape of, for example, a flake, a cylindrical column, an ellipsoid, and the like.

(b) of FIG. 4 illustrates an example case in which the shape-anisotropic members 132 are flakes (flake-shaped particles).

For example, in a case where a transmittance of light with a wavelength of near-infrared light is to be changed, the flakes may each be a flake of a material having a near-infrared ray reflecting characteristic, a flake obtained by providing, on a base flake of glass, mica, or the like, a material having a near-infrared ray reflecting characteristic, a flake obtained by forming, on a base flake, a high-refractive-index layer of titanium oxide or the like so that interference light which depends on a thickness of the high-refractive-index layer and a thickness of the base flake is near-infrared light, a flake of silver or the like which absorbs near-infrared rays by surface plasmon resonance.

Note that (b) of FIG. 4 illustrates an example case in which the shape-anisotropic members 132 (flakes) are each a flake including a glass layer 133 and a near-infrared ray reflection layer 134 which is made of a near-infrared ray reflection material with a near-infrared ray reflecting characteristic and is provided on the glass layer 133.

In a case where, as described above, the light adjustment device 40 is a near-infrared light adjustment device, it is preferable that the shape-anisotropic members 132 each have, for example, a shape and a size (a diameter) which allow regular reflection to occur when the near-infrared ray reflection layers 134 (the near-infrared light reflecting surfaces) of the shape-anisotropic members 132 are aligned substantially parallel to the substrate surface of each of the substrates 110 and 120. In Embodiment 1, as an example, a near-infrared ray reflection material was deposited on a glass layer 133 having a thickness of approximately 35 μm, and a resultant product was pulverized so as to produce, as the shape-anisotropic members 132, flakes each having a diameter of approximately 120 μm.

Note that in a case where the light adjustment device 40 is a near-infrared light adjustment device as described above, the shape-anisotropic members 132 may or may not absorb and reflect light in a visible light region. In a state where the shape-anisotropic members 132 neither absorbs nor reflects light in the visible light region, i.e., in a state where the light adjustment window 1 looks substantially transparent to human eyes, the light adjustment window 1 looks substantially transparent both when the light adjustment window 1 is in a near-infrared blocking state and when the light adjustment window 1 is in a near-infrared transmissive state. Accordingly, the light adjustment window 1 can replace an existing window of a building, a vehicle, or the like, as a window having functionality.

It is preferable that the shape-anisotropic members 132 each have a specific gravity which is, for example, equivalent to that of the medium 131. In a case where a central material having a high specific gravity is coated with a material, such as a resin, which has a low specific gravity, it is possible to adjust an average specific gravity of the shape-anisotropic members 132 by a film thickness of the coating. In a case where the shape-anisotropic members 132 each have a specific gravity significantly different from that of the medium 131, the shape-anisotropic members 132 undesirably sink.

The medium 131 may be any medium having a specific inductive capacity higher than that of glass, and preferably is a medium having a specific inductive capacity of not lower than 20.

In order to ensure functionality as a window, the medium 131 is, for example, a material which transmits light in the visible light region, such as a liquid which absorbs substantially no light in the visible light region, or a product obtained by coloring the liquid with a pigment. The medium 131 has a specific gravity which is preferably equivalent to that of the shape-anisotropic members 132.

The medium 131 may be made of a single substance or a mixture of a plurality of substances. Examples of the medium 131 can encompass propylene carbonate, NMP (N-methyl-2-pyrrolidone), fluorocarbon, and silicone oil.

In a case where, as described above, the light adjustment device 40 is a near-infrared light adjustment device, the medium 131 preferably has low absorptance of light in the near-infrared region, as with the electrodes 112 and 122. In a case where the medium 131 has a high viscosity, a state of the shape-anisotropic member 132 can be maintained, but a drive voltage may be increased. Assuming that the light adjustment system in accordance with Embodiment 1 is the light adjustment window 1 as described above, in a case where the light adjustment window 1 is operated several times per day and, for the sake of reducing power consumption, maintaining the state of the shape-anisotropic members 132 is advantageous in spite of a high drive voltage, the medium 131 may be one which has a viscosity that allows the state of the shape-anisotropic members 132 to be maintained. In order to increase the viscosity, it is possible to (i) use a medium, such as silicone oil or polyethylene glycol, which in itself has a high viscosity or (ii) mix PMMA (polymethylmethacrylate) or the like or mix a material, such as silica microparticles, which exhibits thixotropy.

<Method for Manufacturing Light Adjustment Device 40>

The following description will specifically discuss an example of a method for manufacturing the light adjustment device 40 in accordance with Embodiment 1, as well as materials for the light adjustment device 40.

In Embodiment 1, ITO (Indium Tin Oxide) having a near-infrared ray reflecting characteristic was deposited, as the near-infrared ray reflection layer 134, on the glass layer 133 having a thickness of approximately 35 μm, and a resultant product was pulverized so as to produce, as the shape-anisotropic members 132, flakes each having a diameter of approximately 120 μm.

As the insulating substrates 111 and 121, glass substrates were used. Near-infrared transmissive, transparent conductive films, each of which was made of tantalum-substituted tin oxide or the like and provided with a seed layer made of InTiO (Titanium doped indium oxide) or anatase titanium dioxide, were formed on the respective glass substrates so as to serve as the electrodes 112 and 122. Thus, the pair of substrates 110 and 120 were produced.

It is preferable that the spacer 141 be provided on one of the substrates 110 and 120 in order to ensure a cell thickness. Accordingly, in Embodiment 1, a spacer 141 having, for example, a height of 200 μm was formed on one of the substrates 110 and 120 by photolithography.

Subsequently, a dispersion liquid (flake mixed solution), which contained (i) propylene carbonate as the medium 131 and (ii) the flakes dispersed in the medium 131 as the shape-anisotropic members 132 in a ratio of 20 wt %, was dropped on one of the substrates 110 and 120 on which one the sealing material 142 had been formed.

It is preferable that, for example, a UV-curable resin is formed as the sealing material 142 on the substrate on which the dispersion liquid is dropped. It is more preferable that, on the substrate, a solvent-resistant sealing material be formed on an inner side where the sealing material 142 comes in contact with the medium 131, and a sealing material with a high adhesive force be formed on an outer side of the solvent-resistant sealing material.

The two substrates 110 and 120 were bonded to each other, and then the sealing material 142 was cured so as to produce the light adjustment device 40 in accordance with Embodiment 1.

Note that thixotropy may be imparted to the medium 131 by a technique such as dispersing silica microparticles. This not only enables suppression of sinking of the flakes, but also allows maintaining a state into which the flakes have moved, so that a reduction in frequency of voltage application and a resultant reduction in power consumption are achieved.

<Control of Transmittance of Near-Infrared Light in Light Modulation Layer 130>

Next, with reference to (a) and (b) of FIG. 5, the following description will specifically discuss a method for controlling transmittance of near-infrared light by the light modulation layer 130. The description deals with an example case in which flakes are used as the shape-anisotropic member 132, and a transmittance of near-infrared light is changed by switching, with use of a voltage, an alignment of the flakes between a state in which the flakes are parallel to the substrates 110 and 120 and a state in which the flakes are perpendicular to the substrates 110 and 120.

(a) of FIG. 5 is a view illustrating a near-infrared light reflective state, and (b) of FIG. 5 is a view illustrating a near-infrared light transmissive state.

In a case where, for example, a DC voltage of 2 V (frequency=0 Hz) is applied between the electrodes 112 and 122 facing each other, charged flakes (the shape-anisotropic member 132) are concentrated toward one of the electrodes due to electrophoresis, so that a near-infrared light reflective state is achieved. At this time, an AC voltage of a low frequency of, for example, not higher than 1 Hz may be applied between the electrodes 112 and 122 in place of the DC voltage, so that a phenomenon known as image sticking is prevented.

Note that (a) of FIG. 5 shows an example in which the flakes are aligned so as to be attached to the electrode 112 on the substrate 110 which is on the outdoor side. Although a positive side of the power source section 51 is connected to the electrode 112 and a negative side of the power source section 51 is connected to the electrode 122 in (a) of FIG. 5, Embodiment 1 is not limited to this. It is also possible to employ a configuration in which the negative side of the power source section 51 is connected to the electrode 112 and the positive side of the power source section 51 is connected to the electrode 122. In a case where the negative side of the power source section 51 is connected to the electrode 112 and the positive side of the power source section 51 is connected to the electrode 122, the flakes are aligned so as to be attached to the substrate 120. Further, although (a) of FIG. 5 shows a case in which a polarity of a charge with which the flakes are charged is negative, Embodiment 1 is not limited to this. Instead, the polarity of the charge with which the flakes are charged may be positive. In this case, too, the flakes are attached to a substrate which is opposite to the substrate to which the flakes are attached in the case illustrated in (a) of FIG. 5.

Thus, in a case where a DC voltage having a frequency of 0 Hz or a low frequency AC voltage having a frequency of not higher than 1 Hz is applied to the light modulation layer 130, a force explained by an electrophoretic force or the Coulomb's force causes charged flakes to be drawn to the vicinity of an electrode which is charged with a charge of a polarity opposite to that of a charge with which the flakes are charged. Then, the flakes are aligned in a most stable manner, so that the flakes rotate so as to be attached to the substrate 110 or the substrate 120. Since the flakes are aligned in this manner so that a longitudinal axis of each of the flakes is parallel to the substrates 110 and 120, light entering the light modulation layer 130 from a substrate 110 side is blocked by the flakes, and is not transmitted (passed) through the light modulation layer 130.

Meanwhile, in a case where a high frequency AC voltage of, for example, 60 Hz and 5 V is applied between the electrodes 112 and 122, a force explained by a viewpoint of a dielectrophoresis phenomenon, the Coulomb's force, or electrical energy causes the flakes to move in a direction perpendicular to the substrates 110 and 120 as illustrated in (b) of FIG. 5. Thus, a near-infrared light transmissive state is achieved.

That is, in a case where a high frequency AC voltage of, for example, 60 Hz is applied to the light modulation layer 130, the flakes rotate so that a longitudinal axis of each of the flakes is parallel to a line of electrical force. In other words, the flakes are aligned so that a longitudinal axis of each of the flakes is perpendicular to the substrates 110 and 120. As a result, light entering the light modulation layer 130 from the substrate 110 side is transmitted (passed) through the light modulation layer 130 and exits from a substrate 120 side.

Note that a frequency at which an alignment state of the shape-anisotropic members 132 is switched is preset in accordance with a shape and material of the shape-anisotropic members 132, a thickness (cell thickness) of the light modulation layer 130, and the like.

(a) and (b) of FIG. 6 are views each showing a photomicrograph obtained by capturing an image of an alignment state of flakes in a plan view when a voltage was applied between electrodes 112 and 122 which were facing each other in a light adjustment device 40 (light adjustment cell) which had actually been produced. (a) of FIG. 6 shows a case in which a DC voltage of 2 V was applied between the electrodes 112 and 122, and (b) of FIG. 6 shows a case in which an AC voltage of 60 Hz and 5 V was applied between the electrodes 112 and 122. Note that the light adjustment device 40 in these cases was produced in accordance with the above-described manufacturing method.

As shown in (a) of FIG. 6, in a case where a DC voltage is applied between the electrodes 112 and 122, the flakes are substantially aligned in a direction parallel to the substrates 110 and 120. As a result, near-infrared light entering the light adjustment cell is reflected toward a light incident side.

Meanwhile, as shown in (b) of FIG. 6, in a case where a high frequency AC voltage is applied between the electrodes 112 and 122, the flakes are aligned in a direction perpendicular to the substrates 110 and 120. Accordingly, in (b) of FIG. 6, cross sections of flakes are visible in a plan view. As a result, near-infrared light entering the light adjustment cell is transmitted through the light adjustment cell toward a direction opposite to a light incident side.

As described above, in Embodiment 1, the light adjustment device 40 is configured such that the substrate 110 is provided on the outdoor side, and the substrate 120 is provided on the interior side. Accordingly, in the near-infrared light reflective states shown in (a) of FIG. 5 and (a) of FIG. 6, near-infrared light entering from the outdoors is efficiently reflected toward an incident side by being reflected by regular reflection on flake surfaces of the shape-anisotropic members 132 in the light adjustment device 40.

Meanwhile, in the near-infrared light transmissive stats shown in (b) of FIG. 5 and (b) of FIG. 6, near-infrared light entering from the outdoors is transmitted to the interior side. At this time, in the near-infrared light transmissive state, even in a case where the near-infrared light from the outdoors enters the substrate surface (incident side) of the substrate 110 in an oblique direction as shown in (b) of FIG. 5, the near-infrared light is reflected by the flake surfaces of the shape-anisotropic members 132 so as to enter the substrate 120 on the interior side.

<Time Schedule for Alignment of Shape-Anisotropic Member 132>

In a case where, as described above, switching between a near-infrared light reflective state and a near-infrared light transmissive state is carried out by switching the alignment state of the shape-anisotropic members 132 between a state in which the shape-anisotropic members 132 are parallel to the substrates 110 and 120 and a state in which the shape-anisotropic members 132 are perpendicular to the substrates 110 and 120, the light adjustment device 40 may switch between the near-infrared light reflective state and the near-infrared light transmissive state on the basis of a signal from the communication section 54 or the switch section 55, or may switch between the near-infrared light reflective state and the near-infrared light transmissive state in accordance with a preset time schedule.

In the latter case, for example, the control section 52 controls the alignment state of the shape-anisotropic members 132 on the basis of a time schedule stored in the storage section 53. That is, the alignment state of the shape-anisotropic members 132 is automatically controlled in accordance with the time schedule stored in the storage section 53.

Specifically, the control section 52 controls the power source section 51 to apply a voltage to the light adjustment device 40 so as to cause a change in area of each of the pair of substrates 110 and 120 in which area the shape-anisotropic members 132 are projected onto each of the pair of substrates 110 and 120. In this manner, the control section 52 controls switching between the near-infrared light reflective state and the near-infrared light transmissive state. The control is carried out in accordance with the time schedule.

<Positional Arrangement of Light Adjustment Device 40>

As described above, the light adjustment device 40 is held inside the frame 20 by being fixed by the grating channel 31 within the recess 25 provided in the incorporating section 24 of the frame 20.

The light adjustment device 40 is provided so as to face the windowpane 11 so that, when viewed from a direction perpendicular to a plate surface of the windowpane 11, the light adjustment device 40 is superposed on the plate surface of the windowpane 11.

At this time, as illustrated in FIG. 3, the light adjustment device 40 may be attached to the windowpane 11, for example, via an adhesive agent layer 72 (an attachment layer) made of an adhesive agent, a UV-curable resin, or the like.

Note that in a case where the insulating substrates 111 and 121 are each constituted by a plastic substrate, the light adjustment device 40 can be attached to the windowpane 11 while being warped slightly. Accordingly, this case is advantageous in that the light adjustment device 40 can easily be attached to the windowpane 11 without letting air bubbles in.

Further, in a case where, as described above, the light adjustment device 40 includes the pair of substrates 110 and 120 which are bonded to each other via the sealing material 142, the sealing material 142 is preferably located so as to face the grating channel 31, as illustrated in FIG. 3. This allows the light adjustment device 40 to be installed so that pressure of the grating channel 31 is applied to a portion between the pair of substrates 110 and 120 at which portion a resin sealing material with high strength is present as the sealing material 142. Furthermore, since the sealing material 142 is not visible from outside, the light adjustment window 1 is excellent in design.

Although not illustrated, it is also possible to configure the light adjustment device 40 such that the sealing material 142 is disposed closer to an inner side of the window main body unit 10 than the grating channel 31 is, that is, disposed on an inner side of the frame 20, so as not to face the grating channel 31.

The light modulation layer 130 is not present on an outer side of the sealing material 142. As such, in a case where the sealing material 142 is disposed closer to an inner side (i.e., closer to a central part) of the frame 20 than the grating channel 31 is, the light adjustment device 40 can be configured such that (i) only one of the pair of substrates 110 and 120 is provided in a portion to which pressure of the grating channel 31 is applied or (ii) the wires 71 or a flexible substrate for wires is provided in the portion.

<Modified Example of Electrodes 112 and 122>

In a case where the light adjustment device 40 is provided as one which, like the near-infrared ray light adjustment section, is not intended for performing display, one or a plurality of electrode extraction sections may be provided per transparent electrode.

In a case where a single electrode extraction section is provided per transparent electrode, it is possible to simplify processes for assembling the light adjustment device 40 and also to simplify stretching of the wires 71.

Meanwhile, in a case where a plurality of electrode extraction sections are provided, it is possible to ensure an operation of a part of the light modulation layer 130 which part is located far from a portion where the wires 71 are connected, even in a case where a resistance component is present in the light modulation layer 130 (the light adjustment layer) of the light adjustment device 40 (i.e., in a case where an electric current runs). This prevents a partial delay in response speed.

For example, in a case where the medium 131 in the light modulation layer 130 is one which has a low electric resistance, a voltage gradually decreases on the electrode surface as a distance from a terminal of each of the wires 71 extended from the power source section 51 increases. Accordingly, when a predetermined voltage is applied from the power source section 51, a voltage necessary for driving the light adjustment device 40 is not applied to a portion of each of the electrodes 112 and 122 which portion is far from the power source section 51 (i.e., a portion which is far from the terminal of each of the wires 71). This makes it difficult for the flakes to move.

In view of the above, each of the electrodes 112 and 122 is divided into portions each having a smaller area, it is possible to apply, to a whole of a flake layer within a plane of the electrode surface, a voltage necessary for driving.

(a) and (b) of FIG. 7 are views illustrating an example in which an electrode for applying a voltage to the light modulation layer 130 is divided. Note that (a) and (b) of FIG. 7 each show an example case in which the electrode 122 is divided.

In a case where, as illustrated in (a) of FIG. 7, the electrode 122 of the substrate 120 is divided into a plurality of electrodes **122*a* within a plane of the substrate surface, each of the electrodes 122*a* may be stretched so as to gather at the electrode extraction section 123. At this time, by providing a stretching section 122*b* of each of the electrodes 122*a* in a position outside of a portion where the light modulation layer 130 operates, for example, by providing the stretching section 122*b* under the sealing material 142 (i.e., in a portion overlapping with the sealing material 142) or on an outer side of the sealing material 142**, an undesired decrease in voltage can be avoided.

In a case where, as illustrated in (b) of FIG. 7, the electrode 122 of the substrate 120 is divided into a plurality of electrodes **122*a* within a plane of the substrate surface, the plurality of electrodes 122*a* may not be stretched into stretching sections 122*b*, and instead, an electrode extraction section 123 may be provided to the plurality of electrodes 122*a* so that the wires 71 are directly connected to the respective electrode extraction sections 123**.

In a case where the electrode 122 is thus divided into a plurality of electrodes **122*a*, the electrode 112 facing the electrode 122 may be divided similarly as the electrode 122, or may not be divided. Needless to say, it is also possible to divide only the electrode 112**.

<Window Main Body>

Embodiment 1 has been described on the basis of an example case in which the window main body, which is the light transmissive member, is the windowpane 11. Note, however, that Embodiment 1 is not limited to this. The window main body may be a transmissive board made of a transmissive resin such as a transparent resin, instead of the windowpane 11 made of a glass member (a glass plate).

<Light Adjustment System>

Further, Embodiment 1 has been described on the basis of an example case in which the light adjustment system in accordance with Embodiment 1 is the light adjustment window 1. Note, however, that Embodiment 1 is not limited to this. The light adjustment system may be, for example, a partition, a door, a showcase, or the like which has a light adjustment function.

For example, in a case where a glass member of an article such as a glass partition, a glass door, and a glass showcase is used as the light transmissive member in accordance with Embodiment 1, a light adjustment function is imparted to these articles.

Further, Embodiment 1 has been described on the basis of an example case in which the light adjustment device 40 is a near-infrared ray light adjustment device, but a wavelength of light to be adjusted by the light adjustment device 40 is not limited to a particular one. For example, by changing a material of the shape-anisotropic members 132, a layer configuration of the substrates 110 and 120, and the like, the wavelength may be changed as appropriate in accordance with intended use and the like.

Further, Embodiment 1 has been described on the basis of an example case in which a transmittance of near-infrared light is changed by switching a light adjustment state of the light adjustment device 40 between a near-infrared light reflective state and a near-infrared light transmissive state, but Embodiment 1 is not limited to this.

For example, by changing a material of the shape-anisotropic member 132, a layer configuration of the substrates 110 and 120, a drive voltage, and the like, the light adjustment state of the light adjustment device 40 may be any of a light transmissive state, a light reflective state by scattering, a light reflective (mirror) state by mirror reflection, and a light absorbing (black) state.

Further, as described above, the light adjustment device 40 may be a display device.

In any case, according to Embodiment 1, at least a part of the drive device 50 that drives the light adjustment device 40 is provided separately from a support section (incorporating section) of a support for supporting the light transmissive member of the light adjustment system. This allows providing a light adjustment system which enables battery replacement, parts replacement, repair, and the like without a need to take the support apart.

Further, Embodiment 1 has been described on the basis of an example case in which the light adjustment system is a light adjustment window, and external light (natural light) is used as a light source. However, in a case where the light adjustment system is an article, such as a glass partition, which is used indoors, the light adjustment system may be configured such that an indoor light is used as a light source, and the light adjustment system includes an artificial light source as the light source.

Further, in a case where the light adjustment system is a light adjustment window, the light adjustment window 1 may be a double sliding window or another window such as a left-swinging window, a right-swinging window, a casement window, a sash window, a fixed window, a pivoted window, an outswinging window, and an inswinging window. In Embodiment 1, since it is not necessary to take the frame apart, even a fixed window can have the drive device 50 repaired, a battery of the drive device 50 repaired, etc. and therefore can be replaced by the light adjustment window.

[Embodiment 2]

The following description will discuss, mainly with reference to FIGS. 8 and 9, another embodiment of the present invention. Embodiment 2 will describe differences between Embodiments 1 and 2. The same reference signs will be given to members having the same function as a member in accordance with Embodiment 1, and descriptions on such a member will be omitted.

Note that Embodiment 2, too, will be described with reference to an example case in which a light adjustment system in accordance with Embodiment 2 is a light adjustment window, but Embodiment 2 is not limited to this.

<Schematic Configuration of Light Adjustment Window 1>

FIG. 8 is a cross-sectional view schematically illustrating a main part of a light adjustment window 1 in accordance with Embodiment 2. FIG. 9 is a cross-sectional view schematically illustrating a main part of a window main body unit 10 of the light adjustment window 1 in accordance with Embodiment 2.

The light adjustment window 1 in accordance with Embodiment 2 has the same configuration as the light adjustment window 1 in accordance with Embodiment 1 except for the following respects.

The light adjustment window 1 in accordance with Embodiment 1 includes a single-plate glass (the windowpane 11) as a light transmissive member (a window main body). Meanwhile, the light adjustment window 1 in accordance with Embodiment 2 is a double-glazed window, and includes, as a window main body (a light transmissive member), a double-glazed glass consisting of windowpanes 11 and 12 as illustrated in FIGS. 8 and 9.

The windowpanes 11 and 12 are identical to each other in outer shape. The windowpanes 11 and 12 are disposed so as to face each other and be spaced apart from each other via a spacer 32, so that, when viewed from a direction perpendicular to a plate surface of each of the windowpanes 11 and 12, a plate surface of the windowpane 12 (a second light transmissive member) is superposed on a plate surface of the windowpane 11 (a first light transmissive member) with a light adjustment device 40 interposed therebetween.

Accordingly, the light adjustment window 1 (the light adjustment system) in accordance with Embodiment 2 includes the windowpanes 11 and 12 (the window main body, the light transmissive member), a frame 20 (a support), a grating channel 31, the spacer 32, the light adjustment device 40, a drive device 50 (see FIG. 2), and a communication device 61 (see FIG. 2).

The windowpanes 11 and 12 may be made of the same material or respective different materials, and may have the same thickness or respective different thicknesses.

The windowpane 11 is disposed so as to face outdoors, and the windowpane 12 is disposed so as to face indoors.

As in the case of Embodiment 2, when providing a light adjustment device 40 to a window main body constituted by a double-glazed glass, it is possible to prevent a damage of the light adjustment device 40 by providing the light adjustment device 40 between two windowpanes 11 and 12.

In Embodiment 2, too, the light adjustment device 40 may be attached to the windowpane 11 with use of, for example, an adhesive agent layer 72 (an attachment layer) made of an adhesive agent, a UV-curable resin, or the like as illustrated in FIG. 9.

For example, in a case where the light adjustment device 40 is a near-infrared ray light adjustment section, attaching the light adjustment device 40 to the windowpane 11, which is provided on an outdoor side, allows blocking near-infrared light from the sun before the near-infrared light reaches a space section between the windowpane 11 and the windowpane 12. This enables achieving an excellent heat-insulation effect in summer.

The spacer 32 may be an existing spacer, for example, an aluminum spacer or resin spacer containing a desiccant agent, or the like.

In Embodiment 2, the light adjustment device 40 is attached to a surface of the windowpane 11 on the outdoor side which surface faces the windowpane 12. As a result, the spacer 32 is disposed between the light adjustment device 40 and the windowpane 12.

The grating channel 31 is wound around the windowpanes 11 and 12 so as to sandwich the windowpane 11, to which the light adjustment device 40 is attached, and the windowpane 12. As illustrated in FIG. 8, the windowpanes 11 and 12 and the light adjustment device 40 are held inside the frame 20 by being fixed by the grating channel 31 within a recess 25 provided in an incorporating section 24 of the frame 20.

The windowpanes 11 and 12 and the light adjustment device 40 are integrated with one another by means of the spacer 32 and the grating channel 31. In Embodiment 2, (i) the window main body unit 10 includes the windowpanes 11 and 12, the light adjustment device 40, the spacer 32, and the grating channel 31 and (ii) the windowpanes 11 and 12, the light adjustment device 40, the spacer 32, and the grating channel 31 are integrally assembled, as a single window main body unit 10, to the frame 20.

As such, as illustrated in FIG. 9, in a case where the light adjustment device 40 includes the pair of substrates 110 and 120 which are bonded to each other with use of a sealing material 142 as shown in Embodiment 1, the sealing material 142 is preferably located so as to face the grating channel 31 and the spacer 32. This allows the light adjustment device 40 to be installed so that pressure of each of the grating channel 31 and the spacer 32 is applied to a portion between the pair of substrates 110 and 120 at which portion a resin sealing material with high strength is present as the sealing material 142. Furthermore, since the sealing material 142 is not visible from outside, the light adjustment window 1 is excellent in design.

Although not illustrated, it is also possible to configure the light adjustment device 40 such that the sealing material 142 is disposed closer to an inner side of the window main body unit 10 than the grating channel 31 and the spacer 32 are, that is, disposed on an inner side of the frame 20, so as not to face the grating channel 31 and the spacer 32.

This allows the light adjustment device 40 to be configured such that (i) only one of the pair of substrates 110 and 120 is provided in a portion to which pressure of each of the grating channel 31 and the spacer 32 is applied or (ii) wires 71 or a flexible substrate for wires is provided in the portion.

Note that since the double-glazed glass is used as the window main body as described above, the light adjustment window 1 in accordance with Embodiment 2 has four interfaces between at least, for example, a solid such as glass and, for example, gas such as air. On each of the interfaces, interfacial reflection occurs which causes a decrease in transmittance of light including a visible light beam. It is therefore preferable that an antireflection film be provided on each of the interfaces. For example, in a case where the light adjustment device 40 is attached to the windowpane 11 as illustrated in FIG. 9, it is preferable that an antireflection film 81 be provided on a surface of the light adjustment device 40 which surface faces the windowpane 12.

Needless to say, it is also possible to provide the antireflection film 81 on at least one of an interface between the windowpane 11 and air and an interface between the windowpane 12 and air, or provide the antireflection film 81 on all of the four interfaces.

The antireflection film 81 may be an existing antireflection film, for example, an AR (Anti Reflective) film, a LR (Low Reflective) film, a moth-eye film, or the like.

[Embodiment 3]

The following description will discuss, mainly with reference to FIG. 10, another embodiment of the present invention. Embodiment 3 will describe differences between Embodiment 3 and Embodiments 1 and 2. The same reference signs will be given to members having the same function as a member in accordance with each of Embodiments 1 and 2, and descriptions on such a member will be omitted.

Note that Embodiment 3, too, will be described with reference to an example case in which a light adjustment system in accordance with Embodiment 3 is a light adjustment window, but Embodiment 3 is not limited to this.

<Schematic Configuration of Light Adjustment Window 1>

FIG. 10 is a cross-sectional view schematically illustrating a main part of a window main body unit 10 of a light adjustment window 1 in accordance with Embodiment 3.

The light adjustment window 1 in accordance with Embodiment 3 has the same configuration as the light adjustment windows 1 in accordance with respective Embodiments 1 and 2 except for the following respects.

As with Embodiment 2, the light adjustment window 1 in accordance with Embodiment 3 includes, as a window main body (a light transmissive member), a double-glazed glass consisting of windowpanes 11 and 12 as illustrated in FIG. 10.

A light adjustment device 40 is provided between the windowpanes 11 and 12 so as to be spaced apart from each of the windowpanes 11 and 12.

The light adjustment device 40 is installed in place of a central glass of a triple glass without use of an adhesive agent layer (an adhesive layer) by, for example, having both sides of the light adjustment device 40 held by spacers 32 and 32. As with Embodiment 2, the spacer 32 may be an existing spacer.

In Embodiment 3, too, provision of the light adjustment device 40 between the two windowpanes 11 and 12 allows avoiding a damage of the light adjustment device 40.

In Embodiment 3, a grating channel 31 is wound around the windowpanes 11 and 12 so as to sandwich the windowpanes 11 and 12 between which the light adjustment device 40 is provided.

The windowpanes 11 and 12 and the light adjustment device 40 are integrated with one another by means of the spacers 32 and 32 and the grating channel 31. In Embodiment 2, (i) the window main body unit 10 includes the windowpanes 11 and 12, the light adjustment device 40, the spacers 32 and 32, and the grating channel 31 and (ii) the windowpanes 11 and 12, the light adjustment device 40, the spacers 32 and 32, and the grating channel 31 are integrally assembled, as a single window main body unit 10, to a frame 20.

As such, as illustrated in FIG. 10, in a case where the light adjustment device 40 includes the pair of substrates 110 and 120 which are bonded to each other with use of a sealing material 142 as shown in Embodiment 1, it is preferable that (i) the sealing material 142 be located so as to face the grating channel 31 and the spacers 32 and 32 or (ii) the sealing material 142 is disposed closer to an inner side of the window main body unit 10 than the grating channel 31 and the spacers 32 and 32 are, that is, disposed on an inner side of the frame 20, so as not to face the grating channel 31 and the spacers 32 and 32.

Although FIG. 10 shows an example case in which the sealing material 142 is disposed closer to an inner side of the frame 20 than the grating channel 31 and the spacers 32 and 32 are, the sealing material 142 may be located so as to face the grating channel 31 and the spacers 32, as illustrated in FIGS. 3 and 9.

In a case where the sealing material 142 is disposed closer to the inner side of the frame 20 than the grating channel 31 and the spacers 32 and 32 are, it is possible to employ a configuration in which only one of the pair of substrates 110 and 120 is provided in a portion to which pressure of each of the grating channel 31 and the spacers 32 and 32 is applied, as illustrated in FIG. 10. Alternatively, in the case above, the light adjustment device 40 may be configured such that wires 71 or a flexible substrate for wires is provided in the portion to which the pressure of each of the grating channel 31 and the spacers 32 and 32 is applied.

Note that the light adjustment window 1, which has a triple glass configuration in which the light adjustment device 40 is disposed at a center of the two windowpanes 11 and 12 as illustrated in FIG. 10, has six interfaces between at least, for example, a solid such as glass and, for example, gas such as air. On each of the interfaces, interfacial reflection occurs which causes a decrease in transmittance of light including a visible light beam. As such, as illustrated in FIG. 10, in a case where the light adjustment device 40 is disposed at the center of the two windowpanes 11 and 12, it is preferable that, for example, an antireflection film 81 be provided on both surfaces of the light adjustment device 40.

Needless to say, it is also possible to provide the antireflection film 81 on at least one of an interface between the windowpane 11 and air and an interface between the windowpane 12 and air, or provide the antireflection film 81 on all of the six interfaces.

[Embodiment 4]

The following description will discuss, mainly with reference to FIG. 11 and (a) and (b) of FIG. 12, another embodiment of the present invention. Embodiment 4 will describe differences between Embodiment 4 and Embodiments 1 through 3. The same reference signs will be given to members having the same function as a member in accordance with each of Embodiments 1 through 3, and descriptions on such a member will be omitted.

Note that Embodiment 4, too, will be described with reference to an example case in which a light adjustment system in accordance with Embodiment 4 is a light adjustment window, but Embodiment 4 is not limited to this.

<Schematic Configuration of Light Adjustment Window 1>

FIG. 11 is an elevation view schematically illustrating a main part of a light adjustment window 1 in accordance with Embodiment 4. (a) and (b) of FIG. 12 are cross-sectional views each schematically illustrating a main part of the light adjustment window 1 in accordance with Embodiment 4. (a) of FIG. 12 shows a state in which the light adjustment window 1 is unlocked, and (b) of FIG. 12 shows a state in which the light adjustment window 1 is locked.

The light adjustment window 1 in accordance with Embodiment 4 has the same configuration as the light adjustment windows 1 in accordance with respective Embodiments 1 through 3 except for the following respects.

The light adjustment window 1 in accordance with Embodiment 4 is a double sliding window which is opened and closed by being slid in a lateral direction, and includes a first light adjustment window 2 and a second light adjustment window 3 which are provided so as to be slidable inside a window frame 7.

The first light adjustment window 2 is a front-side shoji provided on a front side when viewed from an operator, and the second light adjustment window 3 is a back-side shoji provided on a back side (behind) of the first light adjustment window 2 when viewed from the operator.

The first light adjustment window 2 includes a window main body unit 10A and a frame 20A (a first frame) for supporting the window main body unit 10A. The second light adjustment window 3 includes a window main body unit 10B and a frame 20B (a second frame) for supporting the window main body unit 10B.

The window main body units 10A and 10B have the same configuration as each window main body unit 10 in accordance with Embodiments 1 through 3.

The frames 20A and 20B have the same configuration as each frame in accordance with Embodiments 1 through 3 except that only one of stiles 23 of the frame 20A is provided with an opening and closing section 27 as illustrated in FIG. 11.

That is, the light adjustment window 1 (a light adjustment system) in accordance with Embodiment 4 includes the window main body units 10A and 10B, the frames 20A and 20B (supports), a drive device 50, and a communication device 61.

The window main body unit 10A includes, as a light transmissive member, at least one window main body (a first window main body) made of a light transmissive material such as glass or a transparent resin, and includes, as a light adjustment device, a light adjustment device 40 (a first light adjustment section, a first light adjustment device) which is disposed so as to face the window main body.

The window main body unit 10B includes, as a light transmissive member, at least one window main body (a second window main body) made of a light transmissive material such as glass or a transparent resin, and includes, as a light adjustment device, a light adjustment device 40 (a second light adjustment section, a second light adjustment device) which is disposed so as to face the window main body.

The first light adjustment window 2 and the second light adjustment window 3 are configured such that (i) when the light adjustment window 1, which is a double sliding window, is opened, the window main body unit 10A inside the frame 20A of the first light adjustment window 2 and the window main body unit 10B inside the frame 20B of the second light adjustment window 3 overlap with each other when viewed from the front and (ii) in a state where the light adjustment window 1 is closed, a stile 23 of the first light adjustment window 2, which stile 23 is a meeting stile and located on an inner side of the light adjustment window 1, and a stile 23 of the second light adjustment window 3, which stile 23 is a meeting stile and located on an inner side of the light adjustment window 1, overlap with each other when viewed from the front.

Note that "when viewed from the front" means a view from a direction perpendicular to plate surfaces of the window main bodies (e.g., the windowpanes 11) of the window main body units 10A and 10B.

When viewed from a direction along a cross section of the light adjustment window 1, opening the double sliding window (the light adjustment window 1) causes the window main body unit 10A and the window main body unit 10B to be superposed on each other, and closing the double sliding window brings the stiles 23, which are meeting stiles, into contact with each other.

Note that the first light adjustment window 2 and the second light adjustment window 3 are disposed such that the first light adjustment window 2 is located on an interior side when the first light adjustment window 2 and the second light adjustment window 3 overlap with each other, and the second light adjustment window 3 is located on an outdoor side when the first light adjustment window 2 and the second light adjustment window 3 overlap with each other. In other words, the first light adjustment window 2 is an interior side shoji and the second light adjustment window 3 is an outdoor side shoji.

In Embodiment 4, as illustrated in FIG. 11, out of the stiles 23 (i.e., the meeting stiles) which overlap with each other when the double sliding window is closed, the stile 23 which is located on the interior side (on an operator side) is provided with the opening and closing section 27 on a part of a surface of the stile 23.

The opening and closing section 27 is provided only to the first light adjustment window 2 which is located on the interior side when the double sliding window is closed. The drive device 50 is provided in a containing section 26, which is included in the first light adjustment window 2 and covered by the opening and closing section 27.

In Embodiment 1, the first light adjustment window 2 includes (i) a connection section for connection with the second light adjustment window 3 and (ii) wires connected to the connection section. Meanwhile, the second light adjustment window 3 includes (i) a connection section for connection with the first light adjustment window 2 and (ii) wires connected to the connection section.

The connection section of the first light adjustment window 2 is provided on a surface, which faces the second light adjustment window 3, of the stile 23 of the first light adjustment window 2 which stile 23 is a meeting stile.

Meanwhile, the connection section of the second light adjustment window 3 is provided on a surface, which faces the first light adjustment window 2, of the stile 23 of the second light adjustment window 3 which stile 23 is a meeting stile.

In Embodiment 4, when the double sliding window is closed, that is, when the meeting stile of the first light adjustment window 2 and the meeting stile of the second light adjustment window 3 overlap with each other, the connection section of the first light adjustment window 2 and the connection section of the second light adjustment window 3 are brought into contact with each other. This causes the connection section of the first light adjustment window 2 and the connection section of the second light adjustment window 3 to be electrically connected with each other.

When the connection section of the first light adjustment window 2 and the connection section of the second light adjustment window 3 are brought into contact with each other, the light adjustment devices 40 of the window main body units 10A and 10B of the first light adjustment window 2 and the second light adjustment window 3 are each electrically connected with the power source section 51 through the connection sections of the first light adjustment window 2 and the second light adjustment window 3.

Accordingly, in Embodiment 1, by operating a switch section 55 or the like included in the first light adjustment window 2 in a state where the double sliding window is closed, it is possible to operate, simultaneously or separately, the light adjustment device 40 of the window main body unit 10A of the first light adjustment window 2 and the light adjustment device 40 of the window main body unit 10B of the second light adjustment window 3.

Note that in order to (i) ensure a connection between the connection section of the first light adjustment window 2 and the connection section of the second light adjustment window 3 or (ii) avoid a short circuit and electrification which may occur when the operator touches the connection section of the first light adjustment window 2 including the drive device 50, it is possible to employ a configuration in which another operation different from an operation of opening and closing of the double sliding window is required in order to establish a connection between the connection sections, for example, by synchronizing the connection and an operation (i.e., a locking and unlocking operation) of opening and closing a lock included in the double sliding window.

For example, in a case where the double sliding window includes a crescent lock 4 as the lock as illustrated in FIG. 11, the connection section of the first light adjustment window 2 and the connection section of the second light adjustment window 3 may be configured such that an electrical connection between the connection sections is established or canceled in accordance with an operation of opening and closing the crescent lock 4.

For example, in an example case illustrated in (a) and (b) of FIG. 12, a crescent rotation axis 5 of the crescent lock 4 is provided with an abutting member 6 which abuts against a connection section 221 of the first light adjustment window 2 when the crescent lock 4 is rotated.

The connection section 221 is disposed so as to face a connection section 211 of the second light adjustment window 3. The connection sections 211 and 221 are each made of an electrically conductive member such as a metal.

The connection section 211 is provided with a plurality of wires 212, in place of wires 71, for connecting the connection section 211 with the light adjustment device 40 of the window main body unit 10B. The connection section 221 is provided with a plurality of wires 225, in place of wires 71, for connecting the connection section 221 with the light adjustment device 40 of the window main body unit 10A. Further, separately from the wires 225 for connecting the connection section 221 with the light adjustment device 40 of the window main body unit 10A, the connection section 221 is provided with a plurality of wires 225 for connecting the connection section 221 with the power source section 51.

The connection section 221 is disposed between a pair of spring support sections 222. The spring support section 222, which faces the connection section 211, has an opening 222*a*.

The connection section 221 is smaller than the opening 222*a*, and includes, as a stopper, a plate-shaped fringe section 226 having a greater diameter than that of the opening 222*a*. A spring 224 is provided between the fringe section 226 and the spring support section 222 and between the fringe section 226 and the spring support section 223.

In a state where the crescent lock 4 is unlocked, the connection section 211 and the connection section 221 are not in contact with each other, as illustrated in (a) of FIG. 12.

When the crescent lock 4 is rotated as illustrated in (b) of FIG. 12 in order to lock the crescent lock 4, the abutting member 6 provided to the crescent rotation axis 5 abuts against the connection section 221. When the connection section 221 is pushed by the abutting member 6, the spring 224 provided between the spring support section 222 and the fringe section 226 contracts. As a result, in synchronization with the operation of rotating the crescent lock 4, the connection section 221 is pushed through the opening 222*a* toward the stile 23 of the second light adjustment window 3 which faces the connection section 221. This brings the connection section 211 and the connection section 221 into contact with each other.

When the crescent lock 4 is unlocked, the connection section 221 which has been pushed by the abutting member 6 is moved backwards by a force with which the spring 224, which has been biased, returns due to release of the bias. This causes the connection section 211 and the connection section 221 to be separated from each other, and accordingly cancels an electrical connection between the connection section 211 and the connection section 221.

Embodiment 4 has been described with reference to an example case in which the connection section 211 and the connection section 221 are provided on respective surfaces, which face each other, of the stiles 23 which overlap with each other when the double sliding window is closed. Note, however, that Embodiment 4 is not limited to this. The connection sections 211 and 221 may be provided to a crescent section and a receiving section of the crescent lock 4, the crescent section and the receiving section being provided on the stiles 23 which overlap with each other when the double sliding window is closed.

<MODIFIED EXAMPLES>

Embodiment 4 has been described with reference to an example case in which the light adjustment window 1 is a double sliding window, but Embodiment 4 is applicable to movable windows in general which have meeting stiles that come into contact with each other when the light adjustment window 1 is closed. That is, the first light adjustment window 2 and the second light adjustment window 3 may each be a sash window which slides in a longitudinal direction. In this case, too, effects similar to those of Embodiment 4 are yielded, since only a difference in sliding direction.

Further, although Embodiment 4 has been described with reference to an example case in which the light adjustment window 1 includes the first light adjustment window 2 and the second light adjustment window 3 which are provided inside the window frame 7, Embodiment 4 is not limited to this. For example, the light adjustment window 1 may include, for example, a third light adjustment window (not shown) in addition to the first light adjustment window 2 and the second light adjustment window 3, and the number of light adjustment windows provided inside the window frame 7 may be three or more.

Further, although Embodiment 4 has been described with a reference case in which the opening and closing section 27 and the containing section 26 are provided only to the frame 20A out of the frame 20A of the first light adjustment window 2 and the frame 20B of the second light adjustment window 3, Embodiment 4 is not limited to this. The opening and closing section 27 and the containing section 26 may be provided to each of the frames 20A and 20B, and the containing section 26 of each of the frames 20A and 20B may contain at least a part of the drive device 50 that drives the light adjustment device 40 supported by a corresponding one of the frames 20A and 20B. In this case, the opening and closing sections 27 and the containing sections 26 of the respective frames 20A and 20B are provided in positions so that the opening and closing section 27 and the containing section 26 of the frame 20A do not overlap with the opening and closing section 27 and the containing section 26 of the frame 20B when the light adjustment window 1 is closed. This allows achieving effects similar to those of Embodiment 1.

[Recap]

A light adjustment system (a light adjustment window 1) in accordance with Aspect 1 of the present invention includes: a light transmissive member (a window main body, a single-plate glass, a double-glazed glass, a windowpane 11, a windowpane 12); a light adjustment device 40 disposed so as to face the light transmissive member, the light adjustment device 40 applying a voltage so as to cause a change in transmittance of light; a drive device 50 that drives the light adjustment device 40; and a support (a frame 20) having an incorporating section 24 into which the light transmissive member and the light adjustment device 40 are incorporated, a part of the support including (i) a containing section 26 that contains at least a part of the drive device 50 and (ii) an opening and closing section 27 that openably and closably covers the containing section 26.

According to the configuration above, it is possible to provide a light adjustment system which allows repair, battery replacement, parts replacement, and the like of the drive device 50 without a need to take the incorporating section 24 apart.

In Aspect 2 of the present invention, the light adjustment system in accordance with Aspect 1 may be configured such that: the drive device 50 includes at least (i) a power source section 51 that supplies the light adjustment device 40 with electric power for driving the light adjustment device 40 and (ii) a control section 52 that controls driving of the light adjustment device 40; and the at least the power source section 51 and the control section 52 are contained in the containing section 26.

In order to drive the light adjustment device 40, at least the power source section 51 and the control section 52 are necessary. Further, it is preferable that a component which is highly likely to need replacement and repair be provided in the containing section 26. According to the configuration above, in a case where the power source section 51 and the control section 52 become unable to operate due to an end of product life or a failure, battery replacement, parts replacement, repair, and the like of the power source section 51 and the control section 52 can be carried out without a need to take the frame 20 apart.

In Aspect 3 of the present invention, the light adjustment system in accordance with Aspect 2 may be configured such that: the drive device 50 further includes at least one of (i) a switch section 55 that switches the transmittance of the light adjustment device 40 and (b) a communication section 54 connected to the control section 52; and the at least one of the switch section 55 and the communication section 54 is contained in the containing section 26.

According to the configuration above, in a case where the drive device 50 includes the switch section 55 and the communication section 54, parts replacement, repair, and the like of the switch section 55 and the communication section 54 can be carried out without a need to take the frame 20 apart.

In Aspect 4 of the present invention, the light adjustment system in accordance with Aspect 3 may be configured such that: the communication section 54 obtains, through a communication network and from a server which delivers weather information (weather, temperature), weather information associated with an address of a place in which the light adjustment system is installed; and the control section 52 controls, in accordance with the weather information obtained, driving of the light adjustment device 40 so as to achieve a target rate of obtaining solar radiation heat.

According to Aspect 4, weather information associated with an address of a place in which the light adjustment system is installed can be reflected to control of the light adjustment device 40.

In Aspect 5 of the present invention, the light adjustment system in accordance with Aspect 3 or 4 may be configured such that the communication section 54 is communicably connected to an HEMS controller.

According to Aspect 5, power consumption of the light adjustment system can be managed by HEMS which manages power consumption of each household electric appliance in each house.

In Aspect 6 of the present invention, the light adjustment system in accordance with any one of Aspects 1 through 5 may be configured such that the light adjustment device 40 is fixed by an attachment layer (an adhesive agent layer 72) to a surface of the light transmissive member.

On an interface between a solid such as glass and, for example, gas such as air, interfacial reflection occurs which causes a decrease in transmittance of light including a visible light beam. According to the configuration above, such an interface is not present between the light adjustment device 40 and the light transmissive member, so that a decrease in transmittance of light including a visible light beam can be suppressed. Further, according to the configuration above, the light adjustment device 40 can be stably held even in a case where the light adjustment device 40 is in a form of a sheet.

In Aspect 7 of the present invention, the light adjustment system in accordance with any one of Aspects 1 through 5 may be configured such that: the light adjustment device 40 includes a pair of substrates 110 and 120 which are bonded to each other with use of a sealing material 142; a gasket (a grating channel 31) is provided between the light transmissive member and the support; and the sealing material 142 is located so as to face the gasket.

According to the configuration above, the light adjustment device 40 can be installed so that pressure of the gasket is applied to a portion between the pair of substrates 110 and 120 at which portion the sealing material 142 is present. Furthermore, according to the configuration above, since the sealing material 142 is not visible from outside, the light adjustment window provided is excellent in design.

In Aspect 8 of the present invention, the light adjustment system in accordance with any one of Aspects 1 through 5 may be configured such that the light transmissive member (a window main body, a double-glazed glass) includes a first light transmissive member (a windowpane 11) and a second light transmissive member (a windowpane 12) facing each other; and the light adjustment device 40 is disposed between the first light transmissive member and the second light transmissive member.

According to the configuration above, provision of the light adjustment device 40 between the first light transmissive member and the second light transmissive member allows avoiding a damage of the light adjustment device 40.

In Aspect 9 of the present invention, the light adjustment system in accordance with Aspect 8 may be configured such that the light adjustment device 40 is fixed by an attachment layer (an adhesive agent layer 72) to a surface of one of the first light transmissive member and the second light transmissive member.

According to the configuration above, for example, in a case where (i) the light adjustment system is a light adjustment window which is installed in a position where the light adjustment window separates the indoors and the outdoors from each other and (ii) the light adjustment device 40 is a near-infrared ray light adjustment section, near-infrared light from the sun can be blocked before reaching a light transmissive member on an interior side. Accordingly, in this case, an excellent heat-insulation effect can be achieved in summer.

In Aspect 10 of the present invention, the light adjustment system in accordance with Aspect 9 may be configured such that the light adjustment device 40 is provided between the first light transmissive member and the second light transmissive member so as to be spaced apart from the first light transmissive member and the second light transmissive member.

According to the configuration above, it is possible to provide a light adjustment system having a triple glass configuration, in which the light adjustment device 40 is disposed between the first light transmissive member and the second light transmissive member.

In Aspect 11 of the present invention, the light adjustment system in accordance with any one of Aspects 8 through 10 may be configured such that: the first light transmissive member and the second light transmissive member are disposed so as to face each other with a spacer 32 interposed therebetween; the light adjustment device 40 includes a pair of substrates 110 and 120 which are bonded to each other with use of a sealing material 142; a gasket (a grating channel 31) is provided between (i) the first light transmissive member and the second light transmissive member and (ii) the support; and the sealing material 142 is located so as to face the gasket and the spacer 32.

According to the configuration above, the light adjustment device 40 can be installed so that pressure of the gasket and the spacer 32 is applied to a portion between the pair of substrates 110 and 120 at which portion the sealing material 142 is present. Furthermore, according to the configuration above, since the sealing material 142 is not visible from outside, the light adjustment window is excellent in design.

In Aspect 12 of the present invention, the light adjustment system in accordance with any one of Aspects 8 through 10 may be configured such that: the first light transmissive member and the second light transmissive member are disposed so as to face each other with a spacer 32 interposed therebetween; the light adjustment device 40 includes a pair of substrates 110 and 120 which are bonded to each other with use of a sealing material 142; a gasket (a grating channel 31) is provided between (i) the first light transmissive member and the second light transmissive member and (ii) the support; one of the pair of substrates 110 and 120 is larger than the other of the pair of substrates 110 and 120; and the sealing material 142 is located so as not to face the gasket and the spacer 32, and only the one of the pair of substrates 110 and 120 faces the gasket and the spacer 32.

According to the configuration above, it is possible to realize a configuration in which only one of the pair of substrates 110 and 120 is provided in a portion to which pressure of the gasket is applied. As such, according to the configuration above, it is possible to prevent pressure of the gasket from being applied to a portion (e.g., the light modulation layer etc.) of the pair of substrates 110 and 120 (which are bonded to each other with use of the sealing material 142) which portion is on an inner side of the sealing material 142.

In Aspect 13 of the present invention, the light adjustment system in accordance with any one of Aspects 1 through 12 may be configured such that the light adjustment system is a light adjustment window 1, the light transmissive member is a window main body (a windowpane 11, a windowpane 12), and the support is a frame 20.

According to the configuration above, it is possible to provide a light adjustment window 1 which allows repair, battery replacement, parts replacement, and the like of the drive device 50 without a need to take the incorporating section 24 of the window main body apart.

In Aspect 14 of the present invention, the light adjustment system in accordance with Aspect 13 may be configured such that: the light adjustment window 1 is a movable window having meeting stiles (stiles 23) which are in contact with each other when the light adjustment window 1 is closed; the frame 20 includes a first frame (a frame 20A) and a second frame (a frame 20B) each of which is in a frame shape; the first frame and the second frame are each slidable inside the window frame 7, the first frame and the second frame having the respective meeting stiles; the window main body includes a first window main body (a window main body (a single-plate glass, a double-glazed glass) of the window main body unit 10A, a windowpane 11, a windowpane 12) supported by the first frame and a second window main body (a window main body (a single-plate glass, a double-glazed glass) of the window main body unit 10B supported by the second frame; the light adjustment device 40 includes (i) a first light adjustment device (a light adjustment device 40 of the window main body unit 10A) disposed so as to face the first window main body and (ii) a second light adjustment device (a light adjustment device 40 of the window main body unit 10B) disposed so as to face the second window main body; and the opening and closing section 27 is provided on a part of a surface of one of the meeting stiles of the first and second frames which surface is opposite to a surface of the one of the meeting stiles which surface is in contact with the other of the meeting stiles.

According to the configuration above, it is possible to provide, as a light adjustment system, a movable window, such as a double sliding window and a sash window, which (i) is slidable inside the window frame 7, (ii) has a light adjustment function, and (iii) allows repair, battery replacement parts replacement, and the like of the drive device 50 without a need to take the incorporating section 24 of the window main body apart.

In Aspect 15 of the present invention, the light adjustment system in accordance with Aspect 14 may be configured such that: the meeting stiles of the first and second frames include respective connection sections 211 and 221 Which are connected to each other; the connection section of the one of the meeting stiles, on which one the opening and closing section 27 is provided, is connected to the drive device 50; and when the light adjustment window 1 is closed, the connecting sections 211 and 221 are electrically connected to each other, so that the first light adjustment device and the second light adjustment device are driven by the drive device 50.

According to the configuration above, when the light adjustment window 1 is closed, the connection sections 211 and 221 are electrically connected to each other, so that the first light adjustment device and the second light adjustment device can be driven by the drive device 50.

In Aspect 16 of the present invention, the light adjustment system in accordance with Aspect 15 may be configured such that the meeting stiles include a lock (a crescent lock 4), and the connection sections 211 and 221 come into contact with each other or are separated from each other in accordance with an operation of locking the lock or an operation of unlocking the lock.

According to the configuration above, it is possible to (i) ensure connection between the connection sections 211 and 221 and (ii) avoid a short circuit and electrification which may occur when the operator touches the connection section connected to the drive device 50.

The present invention is not limited to the embodiments described above, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

INDUSTRIAL APPLICABILITY

The light adjustment system of the present invention is readily applicable to, for example, a movable window such as a double sliding window and a sash window, which itself is movable. The light adjustment system of the present invention allows easily maintaining and managing a light adjustment device and a drive device for driving the light adjustment device, with respect to, for example, a building component such as a frame (sash) which needs to be replaced independently of a building.

REFERENCE SIGNS LIST

1 light adjustment window (light adjustment system)
2 first light adjustment window
3 second light adjustment window
4 crescent lock (lock)
5 crescent rotation axis
6 abutting member
7 window frame
10, 10A, 10B window main body unit
11, 12 windowpane (light transmissive member, window main body)
20, 20A, 20B frame (support)
20*a* surface
21 upper frame
22 lower frame
23 stile
25 recess
26 containing section
26*a* opening
26*b* wire through hole
27 opening and closing section
27*a* surface
31 grating channel (gasket)
32 spacer
40 light adjustment device
50 drive device
51 power source section
52 control section
53 storage section
54 communication section
55 switch section
61 communication device
71 wire
72 adhesive agent layer (attachment layer)
81 antireflection film
110, 120 substrate
111, 121 insulating substrate
112, 122, 122*a* electrode
130 light modulation layer
131 medium

132 shape-anisotropic member
133 glass layer
134 near-infrared ray reflection layer
141 spacer
142 sealing material
211, 221 connection section
212, 225 wire
222, 223 spring support section
222*a* opening
224 spring
226 fringe section

The invention claimed is:

1. A light adjustment system, comprising:

a light transmissive member;

a light adjustment device disposed so as to face the light transmissive member, the light adjustment device applying a voltage so as to cause a change in transmittance of light;

a drive device that drives the light adjustment device; and a support having a frame shape in conformity with an outer shape of the light transmissive member, the support supporting the light transmissive member and the light adjustment device, a part of the support including (i) a containing section that contains at least a part of the drive device, the containing section having an opening and (ii) an opening and closing section that openably and closably covers the opening, the opening and closing section being provided on a part of a surface of the support, the light adjustment system being a light adjustment window, the light transmissive member being a window main body, and the support being a frame, the light adjustment window being a movable window having meeting stiles which are in contact with each other when the light adjustment window is closed, the frame including a first frame and a second frame each of which is in a frame shape, the first frame and the second frame being each slidable inside the window frame, the first frame and the second frame having the respective meeting stiles, the window main body including a first window main body supported by the first frame and a second window main body supported by the second frame, the light adjustment device including (i) a first light adjustment device disposed so as to face the first window main body and (ii) a second light adjustment device disposed so as to face the second window main body, the opening and closing section being provided on a part of a surface of one of the meeting stiles of the first and second frames which surface is opposite to a surface of the one of the meeting stiles which surface is in contact with the other of the meeting stiles, the meeting stiles of the first and second frames including respective connection sections which are connected to each other, the connection section of the one of the meeting stiles, on which one the opening and closing section is provided, being connected to the drive device, and when the light adjustment window is closed, the connecting sections being electrically connected to each other, so that the first light adjustment device and the second light adjustment device are driven by the drive device.

2. The light adjustment system as set forth in claim 1, wherein:

the drive device includes at least (i) a power source that supplies the first light adjustment device and the second light adjustment device with electric power for driving the first light adjustment device and the second light adjustment device and (ii) a controller that controls driving of the first light adjustment device and the second light adjustment device; and the at least the power source and the controller are contained in the containing section.

3. The light adjustment system as set forth in claim 2, wherein:

the drive device further includes at least one of (i) a switch that switches the transmittance of the first light adjustment device and the second light adjustment device and (b) a communication section connected to the controller; and the at least one of the switch and the communication section is contained in the containing section.

4. The light adjustment system as set forth in claim 3, wherein:

the communication section obtains, through a communication network and from a server which delivers weather information, weather information associated with an address of a place in which the light adjustment system is installed; and the controller controls, in accordance with the weather information obtained, driving of the first light adjustment device and the second light adjustment device so as to achieve a target rate of obtaining solar radiation heat.

5. The light adjustment system as set forth in claim 3, wherein the communication section is communicably connected to an HEMS controller.

6. The light adjustment system as set forth in claim 1, wherein the first light adjustment device is fixed by a first attachment layer to a surface of the first window main body, and the second light adjustment device is fixed by a second attachment layer to a surface of the second window main body.

7. The light adjustment system as set forth in claim 1, wherein:

the first light adjustment device includes a pair of substrates which are bonded to each other with use of a first sealing material;

the second light adjustment device includes a pair of substrates which are bonded to each other with use of a second sealing material;

a first gasket is provided between the first window main body and the first frame;

a second gasket is provided between the second window main body and the second frame;

the first sealing material is located so as to face the first gasket: and the second sealing material is located so as to face the second gasket.

8. The light adjustment system as set forth in claim 1, wherein:

the first window main body and the second window main body each include a first light transmissive member and a second light transmissive member facing each other;

the first light adjustment device is disposed between the first light transmissive member and the second light transmissive member in the first window main body; and the second light adjustment device is disposed between the first light transmissive member and the second light transmissive member in the second window main body.

9. The light adjustment system as set forth in claim 8, wherein the first light adjustment device is fixed by a first attachment layer to a surface of one of the first light transmissive member and the second light transmissive member in the first window main body, and the second light adjustment device is fixed by a second attachment layer to a surface of one of the first light transmissive member and the second light transmissive member in the second window main body.

10. The light adjustment system as set forth in claim 8, wherein the first light adjustment device is provided between the first light transmissive member and the second light transmissive member in the first window main body so as to be spaced apart from the first light transmissive member and the second light transmissive member, and the second light adjustment device is provided between the first light transmissive member and the second light transmissive member in the second window main body so as to be spaced apart from the first light transmissive member and the second light transmissive member.

11. The light adjustment system as set forth in claim 8, wherein:

the first light transmissive member and the second light transmissive member in the first window main body are disposed so as to face each other with a first spacer interposed therebetween;

the first light transmissive member and the second light transmissive member in the second window main body are disposed so as to face each other with a second spacer interposed therebetween;

the first light adjustment device includes a pair of substrates which are bonded to each other with use of a first sealing material;

the second light adjustment device includes a pair of substrates which are bonded to each other with use of a second sealing material;

a first gasket is provided between (i) the first light transmissive member and the second light transmissive member in the first window main body and (ii) the first frame;

a second gasket is provided between (i) the first light transmissive member and the second light transmissive member in the second window main body and (ii) the second frame;

the first sealing material is located so as to face the first gasket and the first spacer: and the second sealing material is located so as to face the second gasket and the second spacer.

12. The light adjustment system as set forth in claim 8, wherein:

the first light transmissive member and the second light transmissive member in the first window main body are disposed so as to face each other with a first spacer interposed therebetween;

the first light transmissive member and the second light transmissive member in the second window main body are disposed so as to face each other with a second spacer interposed therebetween;

the first light adjustment device includes a pair of substrates which are bonded to each other with use of a first sealing material;

the second light adjustment device includes a pair of substrates which are bonded to each other with use of a second sealing material;

a first gasket is provided between (i) the first light transmissive member and the second light transmissive member in the first window main body and (ii) the first frame;

a second gasket is provided between (i) the first light transmissive member and the second light transmissive member in the second window main body and (ii) the second frame;

in each of the first light adjustment device and the second light adjustment device, one of the pair of substrates is larger than the other of the pair of substrates;

the first sealing material is located so as not to face the first gasket and the first spacer, and only the one of the pair of substrates in the first light adjustment device faces the first gasket and the first spacer; and the second sealing material is located so as not to face the second gasket and the second spacer, and only the one of the pair of substrates in the second light adjustment device faces the second gasket and the second spacer.

13. The light adjustment system as set forth in claim 1, wherein the meeting stiles include a lock, and the connection sections come into contact with each other or are separated from each other in accordance with an operation of locking the lock or an operation of unlocking the lock.

14. The light adjustment system as set forth in claim 1, wherein out of the window main body and the light adjustment device that are supported by the one of the meeting stiles, the opening and closing section is provided on a part of the surface of the one of the meeting stiles on a light adjustment device side.

15. The light adjustment system as set forth in claim 1, wherein the opening and closing section is provided on a part of a surface of a lower portion of the one of the meeting stiles.

16. A light adjustment system as set forth in claim 1, further comprising a wire connected from the drive device to the first light adjustment device and the second light adjustment device, the containing section having a wire through hole through which the wire is passed, the containing section being constituted by a resin having the wire through hole which is waterproof sealed.

* * * * *